US011593358B2

(12) United States Patent
Astigarraga et al.

(10) Patent No.: US 11,593,358 B2
(45) Date of Patent: Feb. 28, 2023

(54) GENERATION OF TEST DATASETS FOR GUARDED COMMANDS

(71) Applicant: International Business Machines Corporation, Armonk, NY (US)

(72) Inventors: Tara Astigarraga, Fairport, NY (US); Saurabh Sinha, Danbury, CT (US); Hao Chen, Beijing (CN); Lian Xue Hu, Beijing (CN); Federico Eduardo Carpi, Buenos Aires (AR); Juan Ariel Brusco Cannata, Buenos Aires (AR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 16/818,596

(22) Filed: Mar. 13, 2020

(65) Prior Publication Data

US 2021/0286805 A1 Sep. 16, 2021

(51) Int. Cl.
*G06F 16/242* (2019.01)
*G06F 16/248* (2019.01)
(Continued)

(52) U.S. Cl.
CPC ........ *G06F 16/242* (2019.01); *G06F 11/3688* (2013.01); *G06F 11/3692* (2013.01); *G06F 16/2282* (2019.01); *G06F 16/248* (2019.01)

(58) Field of Classification Search
None
See application file for complete search history.

(56) References Cited

U.S. PATENT DOCUMENTS 7,885,985 B2   2/2011   Roden
8,239,757 B2   8/2012   Johnson et al.
(Continued)

FOREIGN PATENT DOCUMENTS

CN   107894953   4/2018
CN   109901984   6/2019
WO   2011116471   9/2011

OTHER PUBLICATIONS

Wu et al., "Generating Program Inputs for Database Application Testing", 2011 (Year: 2011).*
(Continued)

*Primary Examiner* — Dawaune A Conyers
(74) *Attorney, Agent, or Firm* — Amin, Turocy & Watson, LLP

(57) ABSTRACT

Systems and techniques that facilitate automated generation of relevant and adequate test datasets based on guarded commands are provided. In various embodiments, a query generation component can generate a query language query based on a first guarded command. In various aspects, an execution component can execute the query language query on a data table to return one or more datasets for testing the first guarded command. In various embodiments, the query generation component can comprise an initialization component that can initialize conditions of a WHERE clause of the query language query based on the first guarded command. In various instances, the query generation component can further comprise a transformation component that can transform the conditions of the WHERE clause of the query language query based on a sequence of guarded commands on which the first guarded command depends. In various cases, the query generation component can further comprise a translation component that can convert the transformed
(Continued)

conditions of the WHERE clause of the query language query into query language syntax.

20 Claims, 20 Drawing Sheets

(51) Int. Cl.
　　*G06F 16/22*　　　(2019.01)
　　*G06F 11/36*　　　(2006.01)

(56) References Cited

U.S. PATENT DOCUMENTS

| | | | |
|---|---|---|---|
| 8,429,614 | B2 | 4/2013 | Zhang et al. |
| 10,339,038 | B1 | 7/2019 | Singh et al. |
| 10,970,196 | B1* | 4/2021 | Goel .................. G06F 11/3684 |
| 2002/0143754 | A1* | 10/2002 | Paulley ............. G06F 16/24534 |
| 2009/0234801 | A1* | 9/2009 | Moor ....................... G06F 8/437 |

OTHER PUBLICATIONS

Liu et al., "Extraction of Attribute Dependency Graph from Database Applications", 2011 (Year: 2011).*

Ramu et al., "A hybrid approach for selecting and optimizing graph traversal strategy for analyzing big code", 2017 (Year: 2017).*

Dinges et al., "Targeted Test Input Generation using Symbolic-Concrete Backward Execution", 2014 (Year: 2014).*

Mell et al., "The NIST Definition of Cloud Computing," Recommendations of the National Institute of Standards and Technology, NIST Special Publication 800-145, Sep. 2011, 7 pages.

"Test Data Generation," https://autonomiq.io/test-data-generation/, 6 pages.

"IBM InfoSphere Optim Test Data Orchestrator calculates data coverage, assembles data for tests, and automates test executions, accelerating agile strategies for continuous data and testing," IBM United States Software Announcement 218-157, dated Mar. 13, 2018, 9 pages.

"IBM InfoSphere Optim Test Data Fabrication," https://www.ibm.com/us-en/marketplace/infosphere-optim-test-data-fabrication/details, 5 pages.

"Orson DataGeneration," https://www.orsontestdata.com/data-generation/, 7 pages.

Lasch De Moura et al. "Test Case Generation from BPMN Models for Automated Testing of Web-Based BPM Applications," IEEE 17th International Conference on Computational Science and Its Applications (ICCSA), 2017, 7 pages.

* cited by examiner

```
1.  RULEID: <rule_id>
2.  WHEN
3.    <condition_1> AND
4.    <condition_2> AND
5.    <assignment_1>
6.    <condition_3> AND
7.    ...
8.  THEN INSERT|UPDATE <table>:
9.    <action_1>
10.   <action_2>
11.   ...
```

204 — line 1
206 — lines 2–7
208 — lines 8–11

```
1.  SELECT: <columns/rows>
2.  FROM: <data table(s)>
3.  WHERE:
4.    <condition_A> AND
5.    <condition_B> AND
6.    <condition_C> AND
7.    ...
```

212 — line 1
214 — line 2
216 — lines 3–7

FIG. 2

GENERATION OF TEST DATASETS FOR GUARDED COMMANDS

BACKGROUND

The subject disclosure relates to automated generation of test datasets, and more specifically to automatically generating relevant and adequate test datasets based on guarded commands.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate automated generation of relevant and adequate test datasets based on guarded commands are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a query generation component that can generate a query language query based on a first guarded command. In various embodiments, the computer-executable components can further comprise an execution component that can execute the query language query on a data table to return one or more datasets for testing the first guarded command.

According to one or more embodiments, the above-described system can be implemented as a computer-implemented method and/or computer program product.

DESCRIPTION OF THE DRAWINGS

FIG. 2 illustrates block diagrams of an example, non-limiting guarded command and an example, non-limiting query language query in accordance with one or more embodiments described herein.

DETAILED DESCRIPTION

Figure 1:
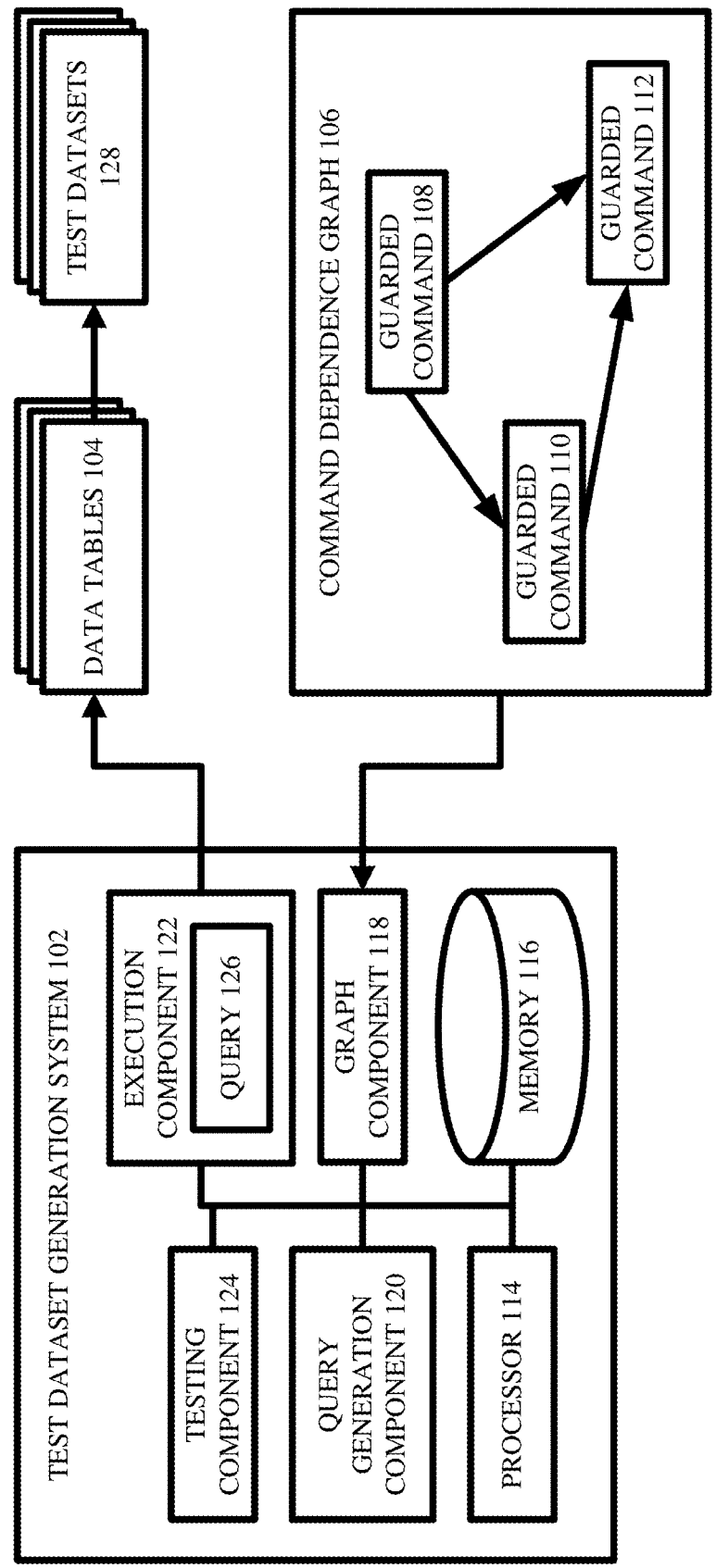
FIG. 1 illustrates a block diagram of an example, non-limiting system that facilitates automated generation of relevant and adequate test datasets based on guarded commands in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Delivery of technology support services (e.g., hardware services, software services, information technology services, cloud-computing services, and/or any other suitable services) is often governed by complex contracts (e.g., service agreements) which specify the types and/or scopes of technology services to be delivered. These contracts often involve numerous, complicated, inter-dependent rules that govern billing rates and/or amounts for the delivered services. In various cases, large technology service contracts can involve hundreds of such rules.

For efficiency, computation of billing information for technology service contracts using such rules can be automated via implementation in a rule language (e.g., programming language). In various instances, each rule can be structured in any suitable programming language as a guarded command. As used herein, the term "guarded command" can mean a programming statement that is guarded by a proposition, such that the statement can be executed if and only if the proposition is true. In various aspects, a guarded command can have a guard clause (e.g., an IF clause/portion, a WHEN clause/portion, a conditions clause/portion, a propositions clause/portion) that lists one or more conditions (e.g., Boolean expressions, and/or any other suitable expressions) that must be satisfied in order to trigger the rule. In various aspects, the guarded command can have a command clause (e.g., a THEN clause/portion, an actions clause/portion, a statements clause/portion) that lists one or more actions (e.g., calculations, selections, assignments, insertions, deletions, data manipulations, and/or any other suitable actions) that are effectuated if the rule is triggered.

In various instances, it can be desirable to execute such rules on test datasets (e.g., to facilitate debugging and/or troubleshooting of the rules) before implementing the rules in a commercial context. However, manual generation of relevant and adequate test datasets can be challenging and time-consuming (e.g., manually creating test datasets that ensure sufficient coverage of pertinent combinations and/or permutations of hundreds to thousands of complicated and/or inter-dependent rule conditions is tedious, error-prone, and haphazard). No conventional techniques or algorithms exist for automating this process. Thus, systems, computer-implemented methods, apparatus and/or computer program products for facilitating automated generation of relevant and adequate test datasets for testing such rules/guarded commands can be advantageous. Various embodiments of the invention can address these issues.

Embodiments described herein include systems, computer-implemented methods, apparatus, and/or computer program products that facilitate automated generation of relevant and adequate test datasets based on guarded commands. In various embodiments, a set of guarded commands (e.g., IF-THEN statements, WHEN-THEN statements, condition-action statements) can be represented as a command dependence graph (e.g., a dependency graph). In various aspects, the command dependence graph can be a directed graph where each node represents a guarded command, and where a directed edge from a first node to a second node indicates that the second node depends on the first node (e.g., indicates that one or more conditions in a guard clause of the second guarded command use, read, and/or otherwise depend upon, in any suitable way, one or more actions, definitions, and/or assignments in a command clause of the first guarded command). In various instances, the command dependence graph can lack loops and/or cyclic dependencies.

Suppose that it is a goal to test an n-th guarded command in the set of guarded commands, for any suitable integer n. As explained below, various embodiments of the invention can automatically generate a query language query which, when executed on a suitable database and/or data table that corresponds to and/or recognizes the query language, can select and/or return from the database and/or data table one or more relevant and adequate test datasets to facilitate testing of the n-th guarded command. In various embodiments, the term "query language" as used herein can mean any suitable query language for querying and/or searching any suitable type of database and/or data table. In some embodiments, the query language can be a structured query language (SQL), in which case the query language query can be a SQL query (e.g., for querying relational databases). In some embodiments, the query language can be any other suitable non-SQL query language, in which case the query language query can be a non-SQL query (e.g., for querying graph databases and/or any other suitable non-SQL databases, such as Cloudant, Elasticsearch, MongoDB, and/or CouchDB). In various embodiments, the query language query can be constructed in any suitable query language and/or syntax that is recognized and/or accepted by the databases and/or data tables being queried. In various aspects, the query language query can have a SELECT clause that can indicate a type of data entry/field to be selected from one or more data tables (e.g., rows, columns, nodes, edges, and/or any other suitable data entry/field), a FROM clause that can identify the one or more data tables on which to execute the query language query and from which the indicated type of data entry/field can be selected, and a WHERE clause that can identify one or more conditions that must be satisfied by the indicated type of data entry/field in order to be selected from the identified data tables (e.g., only rows/columns/nodes that satisfy the conditions listed in the WHERE clause are selected and/or obtained from the identified data tables). Various embodiments of the invention can automatically generate such a query language query (e.g., in the target query language recognized by the identified data tables) based on the command dependence graph, as explained below.

In various embodiments, a graph component can receive the command dependence graph. In various aspects, the graph component can perform backward traversals of the command dependence graph starting at the n-th guarded command (e.g., starting at the guarded command for which test datasets are desired). In various cases, the backward traversal starting at the n-th guarded command can identify a subgraph containing all guarded commands in the command dependence graph on which the n-th guarded command depends (e.g., directly depends, indirectly depends, and/or transitively depends). In various instances, the subgraph can omit all guarded commands in the command dependence graph on which the n-th guarded command does not depend. In various embodiments, the graph component can perform a topological sort on the subgraph to generate an ordered sequence of guarded commands on which the n-th guarded command depends. In various cases, the ordered sequence of guarded commands can end with the n-th guarded command (e.g., the ordered sequence can be structured such that each guarded command in the ordered sequence depends directly and/or transitively from every guarded command that precedes it in the ordered sequence). In various embodiments, any suitable structure of the ordered sequence can be implemented.

In various embodiments, a query generation component can analyze the ordered sequence of guarded commands in a reverse and/or backward fashion (e.g., starting from the n-th guarded command and working backward through guarded commands from which the n-th guarded command depends) to generate the query language query, as explained below. In various instances, the query generation component can comprise an initialization component that can initialize a WHERE clause of the query language query based on the n-th guarded command. Specifically, in various aspects, the initialization component can insert into the WHERE clause of the query language query conditions listed and/or specified in a guard clause (e.g., an IF clause, a WHEN clause, a conditions clause, and/or a propositions clause) of the n-th guarded command.

In various embodiments, the query generation component can further comprise a transformation component that can transform the conditions of the WHERE clause of the query language query based on the ordered sequence of guarded commands. Specifically, in various aspects, the transformation component can begin at the n-th guarded command and can traverse backward one step in the ordered sequence so as to consider a guarded command on which the n-th guarded command depends. In various instances, the transformation component can determine whether any variable of any condition listed in the WHERE clause of the query language query is assigned in a command clause (e.g., a THEN clause, an actions clause, and/or a statements clause) of the guarded command under consideration. If any variable of any condition in the WHERE clause of the query language query is assigned in the command clause of the guarded command under consideration, then the transformation component can replace the variable in the WHERE clause of the query language query with the assignment specified in the command clause of the guarded command under consideration and can insert into the WHERE clause of the query language query conditions from a guard clause (e.g., IF-clause, WHEN clause, conditions clause, and/or propositions clause) of the guarded command under consideration. In various instances, the transformation component can remove from the WHERE clause of the query language query any duplicate and/or tautological conditions. In various instances, the transformation component can check for inconsistent conditions in the WHERE clause of the query language query (e.g., can generate and/or transmit an alert message if inconsistencies are detected). In various aspects, the transformation component can traverse backward another step in the ordered sequence so as to consider yet another guarded command on which the n-th guarded command depends and can repeat the above procedure until all guarded commands in the ordered sequence have been considered.

In various embodiments, the query generation component can further comprise a translation component that can convert the transformed conditions of the WHERE clause of the query language query into query language syntax (e.g., can convert the conditions in the WHERE clause into any suitable target query language syntax that is recognized and/or accepted by the data table to be queried, can replace custom functions used in the guarded commands with analogous and/or equivalent functions in the target query language syntax, can leverage filter functions followed by sequences of projection and/or aggregation functions, and/or can utilize any other suitable translation technique). As mentioned above, in various aspects, any suitable target query language can be implemented (e.g., SQL queries and/or non-SQL queries).

In various aspects, the generated result can be a query language query having a WHERE clause that contains all conditions upon which the n-th guarded command depends (e.g., directly, indirectly, and/or transitively). Thus, the query language query can be structured to return upon execution a test dataset (e.g., having suitable entries/fields from one or more identified data tables) that satisfies all conditions upon which the n-th guarded command depends. In various embodiments, an execution component can execute the query language query on the one or more identified data tables so as to actually obtain the test dataset. In this way, one or more test datasets for testing the n-th guarded command can be automatically generated. In various embodiments, a testing component can execute the n-th guarded command on the one or more test datasets to test the n-th guarded command (e.g., to facilitate debugging and/or troubleshooting of the n-th guarded command).

As explained above, various embodiments of the invention can automatically generate a query language query which, when executed on one or more data tables, returns/obtains a test dataset that satisfies all the conditions on which the n-th guarded command depends (e.g., the n-th guarded command depends directly, indirectly, and/or transitively upon every condition that is added to and/or transformed in the WHERE clause of the query language query). Since such a test dataset satisfies all the conditions on which the n-th guarded command depends, execution of the n-th guarded command on such a test dataset can cause all conditions of the n-th guarded command to evaluate true, which can cause the n-th guarded command to be triggered and generate output. For purposes of explanation, such a test dataset can be referred to as the "all-true" test dataset, and the query language query that obtains/returns the "all-true" test dataset can be referred to as the "all-true" query language query. In various instances, various embodiments of the invention can generate one or more other query language queries by selectively negating one or more conditions in the WHERE clause of the "all-true" query language query. For example, if the WHERE clause of the "all true" query language query has x conditions for any suitable integer x, the query generation component can employ selective negation to generate x other query language queries. Each of these x other query language queries can be generated by negating one of the conditions in the WHERE clause of the "all-true" query language query (e.g., by negating one condition in the WHERE clause while keeping all preceding conditions unnegated). Thus, when executed, these x other query language queries can return/obtain x other test datasets for testing the n-th guarded command, where each of these x other test datasets can cause one of the x conditions of the WHERE clause of the "all-true" query language query to evaluate false. So, the n-th guarded command can be not triggered when executed on each of these x other test datasets. In various embodiments, this can ensure that the n-th guarded command is tested for correctness under different scenarios (e.g., x+1 total scenarios) where all or only a subset of the conditions on which the n-th guarded command depends evaluate true.

Overall, various embodiments of the invention can receive as input a command dependence graph and produce as output one or more query language queries which, when executed on one or more data tables, can return/obtain one or more test datasets for fully testing a desired guarded command. Various embodiments of the invention can generate an ordered sequence of guarded commands by performing a backward traversal and topological sort on the command dependence graph. Various embodiments of the invention can generate the one or more query language queries by analyzing, as disclosed herein, the ordered sequence of guarded commands.

Although the above discussion mentions rules/guarded commands that govern billing in technology services contracts, it should be appreciated that various embodiments of the invention can be implemented to automatically generate relevant and adequate test datasets for any suitable type of guarded command in any suitable context.

As mentioned above, embodiments of the invention can be implemented to generate query language queries in any suitable query language (e.g., any suitable SQL querying paradigm and/or any suitable non-SQL querying paradigm). In various aspects, the query language queries can be generated in the one or more query languages that are recognized and/or accepted by the one or more databases and/or data tables to be queried. In various aspects, the one or more query languages that are recognized and/or accepted by the one or more databases and/or data tables to be queried can be referred to as one or more target query languages.

In various embodiments, all pertinent data can be contained in a single, centralized database and/or data table. In such embodiments, for each test dataset that is desired to be generated, one query language query can be generated to return/obtain the test dataset from the single, centralized database and/or data table. In various other embodiments, the pertinent data can be distributed across multiple databases and/or data tables (e.g., such that no one of the databases and/or data tables contains all data required to return one test dataset). In such embodiments, for each test dataset that is desired to be generated, multiple query language queries (e.g., one for each individual database and/or data table in the distributed system) can be generated to collectively return/obtain the test dataset from the distributed system.

Various embodiments of the invention can be employed to use hardware and/or software to solve problems that are highly technical in nature (e.g., to facilitate the automated generation of relevant and adequate test datasets based on guarded commands), that are not abstract and that cannot be performed as a set of mental acts by a human. Further, some of the processes performed can be performed by a specialized computer (e.g., graph traverser, topological sorter, query language query generator, query language query executer, guarded command executer) for carrying out defined tasks related to automated generation of relevant and adequate test datasets based on guarded commands. In various aspects, such defined tasks can include performing backward traversals and topological sorting on a command dependence graph to generate an ordered sequence of guarded commands, initializing a WHERE clause of a query language query by inserting into the WHERE clause conditions from a guard clause of a desired guarded command, transforming the conditions of the WHERE clause based on the ordered sequence by replacing variables in the WHERE clause with assignments specified in command clauses of guarded commands in the ordered sequence on which the desired guarded command depends, further transforming the conditions of the WHERE clause by inserting into the WHERE clause conditions in guard clauses of guarded commands in the ordered sequence on which the desired guarded command depends, removing duplicate or tautological conditions from the WHERE clause, converting the transformed conditions of the WHERE clause into query language syntax, and/or executing the query language query on a data table to return and/or obtain one or more test datasets for testing the desired guarded command. Such defined tasks are not conventionally performed manually by humans. Indeed, neither the human mind nor a human with pen and paper can perform graph traversals, topological sorting, query language query generation, and/or query language query execution. Instead, various embodiments of the invention are inherently and inextricably tied to computer technology and cannot be implemented outside of a computing environment. In various instances, embodiments of the invention can integrate into a practical application the disclosed algorithms for generating query language queries that are designed to, upon execution, obtain/return relevant and adequate test datasets for testing desired guarded commands. Indeed, in various embodiments, the disclosed algorithms allow computers to automatically generate test datasets that test a desired guarded command under various permutations and/or combinations of conditions, which is clearly a useful and practical application of computers. Moreover, various embodiments of the invention can provide technical improvements to and solve problems that arise in the field of automated generation of relevant and adequate test datasets based on guarded commands, since no known algorithms analyze guarded commands as described herein to facilitate such test dataset generation. Furthermore, various embodiments of the invention can control real-world devices based on the disclosed algorithms. For example, embodiments of the invention can analyze, as described herein, the semantics contained within a set of guarded commands in order to generate one or more real-world query language queries. The query language queries can be structured, as described herein, to return, upon execution of the query language queries on one or more data tables, test datasets for testing a desired guarded command in the set of guarded commands. In various cases, embodiments of the invention can actually execute the generated query language queries on real-world data tables in order to actually obtain the real-world test datasets. In various instances, after obtaining the test datasets, embodiments of the invention can actually execute the desired guarded commands on the real-world test datasets, thereby facilitating real-world troubleshooting and/or debugging of the desired guarded commands. Such embodiments thus constitute a concrete and tangible technical improvement in the prior art.

FIG. 1 illustrates a block diagram of an example, non-limiting system 100 that can facilitate automated generation of relevant and adequate test datasets based on guarded commands in accordance with one or more embodiments described herein. As shown, a test dataset generation system 102 can analyze a command dependence graph 106 and can output as a result a query language query 126 (e.g., depicted as "query 126" in the figures for sake of brevity). In various instances, the test dataset generation system 102 can execute the query language query 126 on one or more data tables 104 in order to return and/or obtain one or more test datasets 128 (e.g., in some cases, one query language query can be designed to return one test dataset; in some cases, multiple query language queries can be designed to collectively return one test dataset, such as in a distributed database environment; in some cases, one query language query can be designed to return multiple test datasets; and/or in some cases, multiple query language queries can be designed to collectively return multiple test datasets). In various aspects, the one or more test datasets 128 can be datasets that are relevant and/or adequate to test a desired guarded command in the command dependence graph 106 (e.g., one of the one or more test datasets 128 can satisfy all conditions of the desired guarded command such that the desired guarded command generates output when executed on the one of the one or more test datasets 128; and/or each of the remaining of the one or more test datasets 128 can fail to satisfy a corresponding condition of the desired guarded command such that the desired guarded command does not generate output when executed on each of the remaining of the one or more test datasets 128).

In various embodiments, the one or more data tables 104 can be any suitable database and/or data structure that stores data (e.g., relational databases and/or data structures in embodiments that implement a SQL querying paradigm, and/or graph databases and/or any other suitable data structures in embodiments that implement non-SQL querying paradigms). In various instances, the one or more data tables 104 can exhibit any suitable distributed and/or centralized structure.

In various embodiments, the command dependence graph 106 can be a dependency graph that contains nodes representing guarded commands (e.g., guarded commands 108-112) and that contains directed edges representing dependency (e.g., definition-use relations) between the guarded commands. In various aspects, a first guarded command can depend upon a second guarded command when a condition in a guard clause (e.g., an IF clause/portion, a WHEN clause/portion, a conditions clause/portion, and/or a propositions clause/portion) of the first guarded command depends upon an action in a command clause (e.g., a THEN clause/portion, an actions clause/portion, and/or a statements clause/portion) of the second guarded command. For example, as shown, there can be a directed edge from the guarded command 108 to the guarded command 110, indicating that a condition of the guarded command 110 reads, uses, and/or otherwise depends upon the output of the guarded command 108. Similarly, there can be a directed edge from the guarded command 110 to the guarded command 112, indicating that a condition of the guarded command 112 reads, uses, and/or otherwise depends upon the output of the guarded command 110. Although FIG. 1 depicts the command dependence graph 106 as containing only three guarded commands, it should be appreciated that, in various embodiments, the command dependence graph 106 can have any suitable number of guarded commands (e.g., tens, hundreds, thousands) with any suitable number and/or arrangement of interdependencies. In various aspects, however, the command dependence graph 106 can lack directed loops and/or cyclic dependencies.

In various embodiments, the test dataset generation system 102 can receive the command dependence graph 106 and/or can communicate with the one or more data tables 104 via any suitable wired and/or wireless electronic connection.

In various embodiments, the test dataset generation system 102 can comprise a processor 114 (e.g., computer processing unit, microprocessor) and a computer-readable memory 116 that is operably connected to the processor 114. The memory 116 can store computer-executable instructions which, upon execution by the processor 114, can cause the processor 114 and/or other components of the test dataset generation system 102 (e.g., graph component 118, query generation component 120, execution component 122, testing component 124) to perform one or more acts. In various embodiments, the memory 116 can store computer-executable components (e.g., graph component 118, query generation component 120, execution component 122, testing component 124), and the processor 114 can execute the computer-executable components.

In various embodiments, the test dataset generation system 102 can comprise a graph component 118. In various aspects, the graph component 118 can receive as input the command dependence graph 106. In various instances, the graph component 118 can perform reverse and/or backward traversals on the command dependence graph 106 starting at a guarded command to be tested, in order to generate a subgraph of guarded commands on which the guarded command to be tested depends. In various cases, the subgraph can lack (e.g., not include) guarded commands on which the guarded command to be tested does not depend. For example, if the guarded command 110 is to be tested (e.g., if the one or more test datasets 128 are being generated for the purpose of testing the guarded command 110), the graph component 118 can perform backward traversals on the command dependence graph 106 starting at the guarded command 110. In various instances, the result of these backward traversals can be a subgraph containing only the guarded command 110, the guarded command 108, and any other guarded commands on which the guarded command 110 depends. Since the guarded command 110 does not depend on the guarded command 112, the guarded command 112 cannot be reached by traversing backward from the guarded command 110 and is thus not included in the resulting subgraph.

In various embodiments, the graph component 118 can perform a topological sort on the subgraph to generate an ordered sequence (e.g., linear ordering) of guarded commands on which the guarded command to be tested depends. In various aspects, for each directed edge in the subgraph from a guarded command A to a guarded command B, the guarded command A can be listed before the guarded command B in the ordered sequence. For example, if the guarded command 112 is to be tested, the graph component 118 can generate (e.g., via reverse/backward traversals) a subgraph containing the guarded command 108, the guarded command 110, and the guarded command 112. In various instances, the graph component 118 can topologically sort the subgraph to yield an ordered sequence, where the guarded command 108 is listed before the guarded command 110 and the guarded command 112 (e.g., since the guarded command 110 and the guarded command 112 depend from the guarded command 108) and where the guarded command 110 is listed before the guarded command 112 (e.g., since the guarded command 112 depends from the guarded command 110). As described herein, various embodiments of the invention can analyze this ordered sequence of guarded commands to generate the query language query 126.

In various embodiments, the test dataset generation system 102 can comprise a query generation component 120. In various aspects, the query generation component 120 can generate the query language query 126 based on the guarded command to be tested and/or based on the ordered sequence of guarded commands generated by the graph component 118. In various embodiments, the query generation component 120 can begin by creating the query language query 126 as an empty query language query (e.g., a query language query shell with an empty SELECT clause, an empty FROM clause, and/or an empty WHERE clause). In various instances, the query generation component 120 can comprise an initialization component (later shown as 304 in FIG. 3) that can initialize a SELECT clause and a FROM clause of the query language query 126 based on the type and/or number of the one or more data tables 104 (e.g., the query generation component 120 can input into the SELECT clause the type of data entry/field to be selected, such as rows and/or columns, and can input into the FROM clause the identities and/or identifying metadata of the one or more data tables 104 on which the query language query 126 is to be executed). In various embodiments, the query generation component 120 can, via the initialization component, initialize a WHERE clause of the query language query 126 based on the guarded command to be tested. Specifically, in various embodiments, the query generation component 120 can, via the initialization component, insert conditions from a guard clause of the guarded command to be tested into the WHERE clause of the query language query 126. For instance, to continue the above example where the guarded command 112 is to be tested, the query generation component 120 can insert any and/or all conditions listed in the guard clause (e.g., the IF clause/portion, the WHEN clause/portion, the conditions clause/portion, and/or the propositions clause/portion) of the guarded command 112 into the empty WHERE clause of the query language query 126.

In various embodiments, the query generation component 120 can further comprise a transformation component (later shown as 306 in FIG. 3) that can transform the conditions of the WHERE clause of the query language query 126 based on the ordered sequence of guarded commands generated by the graph component 118. In various aspects, the transformation component can traverse backward one step in the ordered sequence so as to consider a guarded command on which the guarded command to be tested depends. In various instances, the query generation component 120 can, via the transformation component, determine whether any variable of any condition listed in the WHERE clause of the query language query 126 is assigned in a command clause (e.g., a THEN clause/portion, an actions clause/portion, and/or a statements clause/portion) of the guarded command under consideration. In various aspects, the transformation component can facilitate this by identifying a variable in the WHERE clause of the query language query 126 and scanning the command clause of the guarded command under consideration for the variable. In various instances, if the variable is located in the command clause (e.g., located in a left-hand-side expression of an assignment statement in the command clause), the transformation component can determine that the variable is assigned in the command clause. If so, the query generation component 120 can, via the transformation component, replace the variable in the WHERE clause of the query language query 126 with the corresponding assignment specified in the command clause of the guarded command under consideration (e.g., replace the variable in the WHERE clause with the right-hand-side expression of the assignment statement that is specified in the command clause), and can insert into the WHERE clause of the query language query 126 any and/or all conditions listed in a guard clause (e.g., an IF clause/portion, a WHEN clause/portion, a conditions clause/portion, and/or a propositions clause/portion) of the guarded command under consideration. In various aspects, the transformation component can remove duplicate and/or tautological conditions from the WHERE clause of the query language query 126. For instance, the transformation component can, in various aspects, remove duplicate conditions by identifying a first condition in the WHERE clause, scanning other conditions in the WHERE clause, and removing/deleting any conditions that are identical and/or equivalent to the first condition. In some instances, the transformation component can remove tautological conditions from the WHERE clause by identifying a first condition in the WHERE clause and removing/deleting the first condition if it is always true (e.g., if a left-hand-side expression of the first condition is identical to a right-hand-side expression of the first condition). In various aspects, the transformation component can check for inconsistent conditions in the WHERE clause of the query language query 126 (e.g., can electronically contact and/or alert an operator if conditions are detected that cannot be simultaneously satisfied). In various embodiments, the transformation component can traverse backward by another step in the ordered sequence so as to consider another guarded command on which the guarded command to be tested depends, as described above, and can repeat the above steps/actions until all guarded commands in the ordered sequence have been considered.

For instance, to continue the above example where the guarded command 112 is to be tested, the query generation component 120 can, via the transformation component, traverse one step backward from the guarded command 112 in the ordered sequence (e.g., where the guarded command 108 is listed before the guarded command 110, which is listed before the guarded command 112) so as to consider the guarded command 110. In other words, the transformation component can determine whether or not to transform conditions in the WHERE clause of the query language query 126 based on the guarded command 110. In various aspects, the transformation component can determine (e.g., as described above) whether any variable recited in any condition of the WHERE clause of the query language query 126 (which has so far only been initialized based on the conditions in the guarded command 112) is assigned in a command clause of the guarded command 110. If so, the transformation component can replace the variable in the WHERE clause of the query language query 126 with the corresponding assignment specified in the command clause of the guarded command 110, and can insert into the WHERE clause of the query language query 126 conditions from the guard clause of the guarded command 110. The transformation component can, in some cases, remove (e.g., as described above) duplicate and/or tautological conditions from the WHERE clause of the query language query 126 and can, in some cases, check for inconsistent conditions in the WHERE clause of the query language query 126. In various instances, the transformation component can then traverse backward by another step in the ordered sequence so as to consider the guarded command 108 and can transform the conditions of the WHERE clause of the query language query 126 based on the guarded command 108, as described above. In various aspects, the transformation component can continue in this fashion until all guarded commands in the ordered sequence are considered.

In various embodiments, the query generation component 120 can further comprise a translation component (later shown as 308 in FIG. 3) that can convert the transformed conditions of the WHERE clause of the query language query 126 into query language syntax (e.g., replacing custom functions used to define conditions and/or actions in the guarded commands with corresponding and/or analogous functions in the target query language syntax that is accepted and/or recognized by the data tables to be queried). As mentioned above, any suitable target query language can be implemented in various embodiments of the invention. In some cases, any suitable SQL querying paradigm can be implemented (e.g., to query relational databases), in which case the query language query 126 can be a SQL query. In some cases, any suitable non-SQL querying paradigm can be implemented (e.g., to query graph databases and/or any other suitable non-SQL databases, such as Cloudant, Elasticsearch, MongoDB, and/or CouchDB). In various aspects, the translation component can be configured to convert the conditions in the WHERE clause of the query language query 126 to the target query language syntax, via any suitable conversion and/or mapping technique. In various cases, the query language query 126 can be ready for execution on the one or more data tables 104 after translation by the query generation component 120. Thus, as explained above, the test dataset generation system 102 can, in some embodiments, receive as input the command dependence graph 106 and can produce as real-world output the query language query 126, which is formatted/designed to return/obtain upon execution the one or more test datasets 128.

In various embodiments, the test dataset generation system 102 can comprise an execution component 122. In various aspects, the execution component 122 can actually execute the query language query 126 on the one or more data tables 104. In various instances, execution of the query language query 126 on the one or more data tables 104 can return and/or obtain the one or more test datasets 128. In other words, the test dataset generation system 102 can, in various embodiments, receive as input the command dependence graph 106 and can produce as real-world output the one or more test datasets 128, which can be relevant and adequate for testing a desired guarded command in the command dependence graph 106. In this way, the test dataset generation system 102 can facilitate automated generation of relevant and adequate test datasets based on guarded commands.

In various embodiments, the test dataset generation system 102 can comprise a testing component 124. In various aspects, the testing component 124 can actually execute (e.g., run) the guarded command to be tested on the one or more test datasets 128. In this way, the test dataset generation system 102 can facilitate real-world debugging and/or troubleshooting of the guarded command to be tested.

FIG. 2 illustrates block diagrams of an example, non-limiting guarded command and an example, non-limiting query language query in accordance with one or more embodiments described herein. As shown, FIG. 2 depicts an example, non-limiting structure and/or format of a guarded command 202. In various cases, the guarded command 202 can have a metadata clause 204, which can specify identification information (e.g., name, ID number, and/or any other suitable identification characteristics) of the guarded command 202. In various instances, as shown, the guarded command 202 can be structured as an IF-THEN programming statement and/or a WHEN-THEN programming statement. In various aspects, the guarded command 202 can have a guard clause 206 that can correspond to the IF clause/portion and/or the WHEN clause/portion, as shown. In some cases, the guard clause 206 can be considered a conditions clause and/or a propositions clause. The guard clause 206 can contain and/or specify one or more conditions (e.g., condition_1, condition_2, condition_3) that must be satisfied in order for the guarded command 202 to be triggered. In various instances, each condition can be a Boolean expression on a data field (e.g., row, column, node, and/or any other suitable data entry/field) of the one or more data tables 104. In various cases, the guard clause 206 can contain one or more assignments (e.g., assignment_1) that create temporary variables that can be referenced in subsequent conditions (e.g., condition_3 in FIG. 2 can reference assignment_1 since it comes after assignment_1; however, condition_2 cannot reference assignment_1 since it comes before assignment_1). Although FIG. 2 depicts the conditions in the guard clause 206 as being joined via conjunctive operators (e.g., AND), it is to be appreciated that, in various embodiments, any suitable combinations of any suitable Boolean operators can be implemented (e.g., AND, OR, NOT, EXCLUSIVE OR).

In various aspects, the guarded command 202 can have a command clause 208 that can correspond to the THEN clause/portion, as shown. In some cases, the command clause 208 can be considered an actions clause and/or a statements clause. The command clause 208 can contain/specify one or more actions (e.g., action_1, action_2) to be taken if the conditions in the guard clause 206 are satisfied (e.g., if the overall Boolean expression in the guard clause 206 evaluates true). As shown, in some cases, the actions in the command clause 208 can pertain to inserting and/or updating fields in a data table (e.g., a data table which can be different from the one or more data tables 104, and/or a data table which can be one of the one or more data tables 104). In various instances, any suitable actions can be specified in the command clause 208 (e.g., assignments, insertions, deletions, updates, computations, data manipulations). In various embodiments, the guarded commands 108-112 can have the structure and/or formatting depicted in FIG. 2.

Although FIG. 2 depicts the guarded command 202 as having an explicitly-named WHEN clause and an explicitly-named THEN clause, it should be appreciated that this is for illustration only and that any suitable programming syntax and/or terminology can be used to create the guard clause 206 and the command clause 208 of the guarded command 202.

In addition, as shown, FIG. 2 depicts an example, non-limiting structure and/or format of a query language query 210. In various cases, the query language query 210 can have a SELECT clause 212, which can identify the type of data entry/field that is to be obtained/returned by the query language query 210 (e.g., columns of a data table, rows of a data table, and/or any other suitable field of a queriable database). In various aspects, the query language query 210 can have a FROM clause 214, which can identify the particular databases and/or data tables which are to be queried by the query language query 210 (e.g., name of data table, ID number of data table, and/or any other suitable identification characteristics). In various instances, the query language query 210 can have a WHERE clause 216, which can identify one or more conditions (e.g., condition_A, condition_B, condition_C) that must be satisfied by a particular data entry/field in the identified data table in order for that particular data entry/field to be returned/obtained by the query language query 210. In various embodiments, each condition in the WHERE clause 216 can be a Boolean expression on a data field (e.g., row, column) of the one or more data tables 104. Although FIG. 2 depicts the conditions in the WHERE clause 216 as being joined via conjunctive operators (e.g., AND), it is to be appreciated that, in various embodiments, any suitable combination of any suitable Boolean operators can be implemented (e.g., AND, OR, NOT, EXCLUSIVE OR). In various instances, a row and/or column of a data table can be returned/obtained by executing the query language query 210 on the data table only if the conditions in the WHERE clause 216 are satisfied (e.g., only if the overall Boolean expression in the WHERE clause 216 evaluates true). In various cases, the query language query 126 can be structured and/or formatted as the query language query 210. As explained above, various embodiments of the invention can initialize, transform, and/or translate conditions in the WHERE clause 216 of the query language query 210 based on the command dependence graph 106. In various aspects, embodiments of the invention can manipulate, as described herein, the conditions in the WHERE clause 216 of the query language query 210 so that the query language query 210 is executable on a suitable data table (e.g., one or more data tables 104) to return and/or obtain relevant and adequate test datasets for testing a particular guarded command.

Although FIG. 2 depicts the query language query 210 as having an explicit SELECT clause 212, an explicit FROM clause 214, and an explicit WHERE clause 216, it should be appreciated that this is for illustration only and that any suitable programming syntax and/or terminology can be used to create the query language query 210 (e.g., SQL syntax/terminology, non-SQL syntax/terminology, and/or any other suitable query language syntax/terminology). In various aspects, some query languages can have an explicit SELECT clause 212, an explicit FROM clause 214, and/or an explicit WHERE clause 216 (e.g., SQL). In various aspects, other query languages can lack an explicit SELECT clause 212, an explicit FROM clause 214, and/or an explicit WHERE clause 216 (e.g., various non-SQL paradigms). Such other query languages, however, can nevertheless have analogous and/or functionally equivalent clauses, syntax, and/or terminology that accomplish the same and/or similar functions/purposes as the above-described SELECT, FROM, and/or WHERE clauses. For example, a non-SQL query can have a clause/portion that specifies a type of data entry/field (e.g., row, column, node, edge) to be selected/obtained/returned by the non-SQL query, even if the non-SQL query does not have an explicit SELECT clause 212. As another example, a non-SQL query can have a clause/portion that identifies one or more databases to be queried by the non-SQL query, even if the non-SQL query does not have an explicit FROM clause 214. As another example, a non-SQL query can have a clause/portion that specifies one or more conditions and/or criteria (e.g., Boolean expressions joined by Boolean operators) that must be satisfied by a data element in order for that data element to be selected/obtained/returned by the non-SQL query, even if the non-SQL query does not have an explicit WHERE clause 216. Thus, in various embodiments, it should be appreciated that the herein disclosure and figures use the terms SELECT, FROM, and WHERE in an exemplary and non-limiting way, and that the herein described principles and/or algorithms can be applied in the context of any suitable query language using analogous and/or equivalent clauses/syntax/terminology. For instance, in the context of a SQL paradigm, embodiments of the invention can create, initialize, and/or manipulate the SELECT, FROM, and/or WHERE clauses of a SQL query as described herein. In the context of any suitable non-SQL paradigm, embodiments of the invention can create, initialize, and/or manipulate clauses, syntax, and/or terminology of a non-SQL query that are analogous and/or functionally equivalent to the SELECT, FROM, and/or WHERE clauses used in SQL. In various aspects, embodiments of the invention can be used with any suitable query language, regardless of the particular syntax, terminology, query structures, and/or query protocols implemented in the query language.

Figure 3:
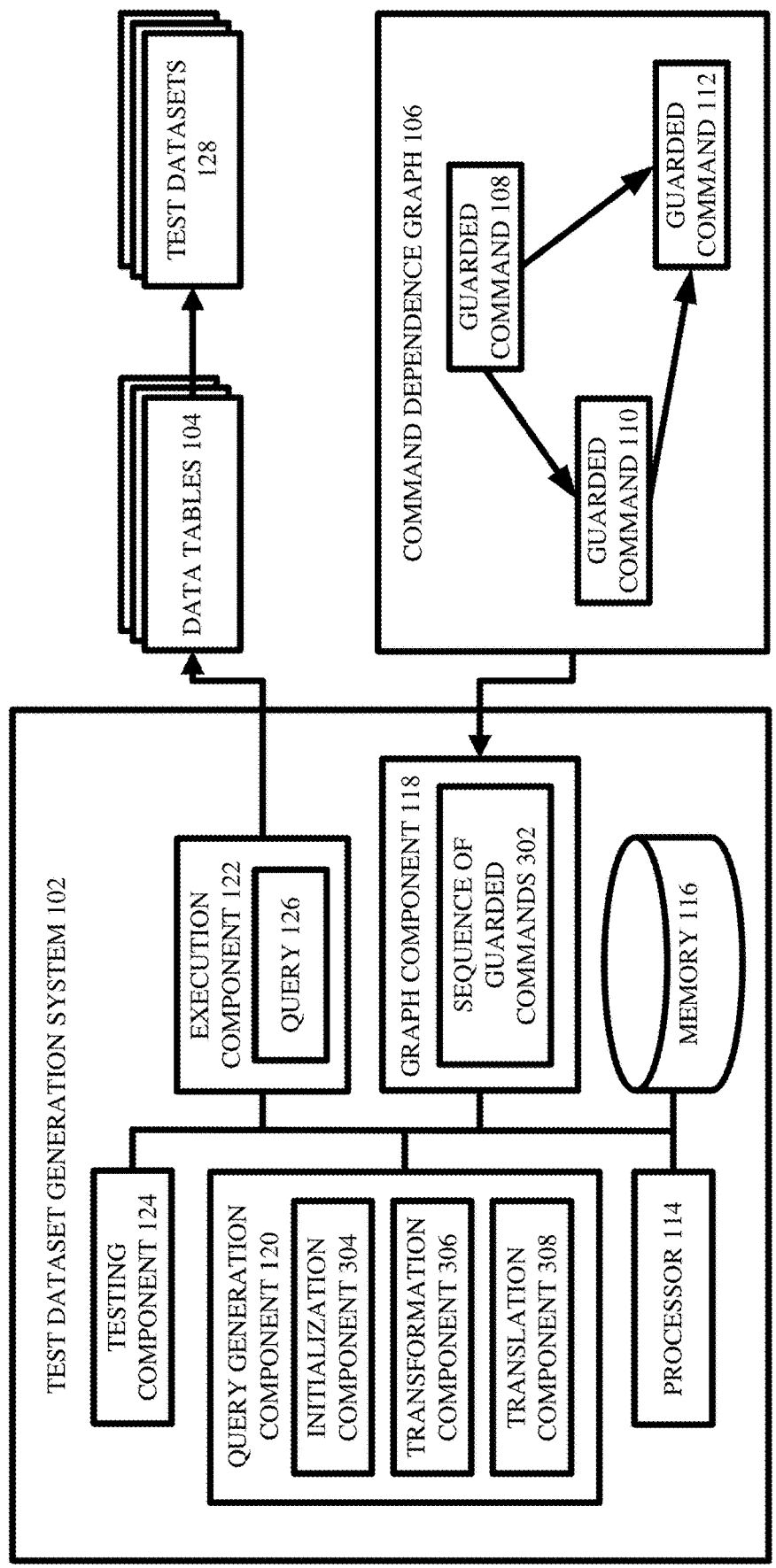
FIG. 3 illustrates a block diagram of an example, non-limiting system that facilitates automated generation of relevant and adequate test datasets based on guarded commands in accordance with one or more embodiments described herein.

FIG. 3 illustrates a block diagram of an example, non-limiting system 300 that can facilitate automated generation of relevant and adequate test datasets based on guarded commands in accordance with one or more embodiments described herein. As shown, the system 300 can, in various embodiments, comprise the same components as the system 100, and can further comprise a sequence of guarded commands 302, an initialization component 304, a transformation component 306, and a translation component 308.

As explained above, in various embodiments, the graph component 118 can receive as input the command dependence graph 106. In some cases, the graph component 118 can also receive as input an indication (e.g., via operator input and/or feedback through any suitable interface device) of which guarded command in the command dependence graph 106 is to be tested. Based on this information, the graph component 118 can, in various embodiments, generate the sequence of guarded commands 302. Specifically, in various instances, the graph component 118 can perform backward traversals on the command dependence graph 106 starting at the guarded command to be tested. Such backward traversals can be performed via any suitable mathematical, statistical, and/or machine learning techniques and can generate a subgraph of the command dependence graph 106, where the subgraph includes those guarded commands on which the guarded command to be tested depends and does not include those guarded commands on which the guarded command to be tested does not depend. The graph component 118 can topologically sort (e.g., via any suitable sorting algorithm) the subgraph to generate the sequence of guarded commands 302 (e.g., a linear ordering of the guarded commands in the subgraph). In various aspects, for each directed edge in the subgraph from a first guarded command to a second guarded command, the sequence of guarded commands 302 can list the first guarded command before the second guarded command. For example, suppose that the guarded command 110 is to be tested. In such case, the graph component 118 can perform backward traversals on the command dependence graph 106 starting at the guarded command 110 (e.g., the guarded command to be tested). These backward traversals can result in a subgraph that contains the guarded command 108 (since the guarded command 110 depends on the guarded command 108) and that does not contain the guarded command 112 (since the guarded command 110 does not depend on the guarded command 112). In various aspects, the graph component 118 can perform topological sorting on the subgraph to generate the sequence of guarded commands 302.

In various aspects, the backward traversals of the command dependence graph 106 can be thought of as selecting from the command dependence graph 106 only those guarded commands on which the guarded command to be tested depends. Once all the guarded commands on which the guarded command to be tested depends are obtained (e.g., in the subgraph), the topological sorting can linearly order those guarded commands to generate the sequence of guarded commands 302. As explained herein, various embodiments of the invention can leverage the sequence of guarded commands 302 to generate the query language query 126.

As another example, suppose that the guarded command 112 is to be tested. In such case, the graph component 118 can receive the command dependence graph 106, can perform reverse traversals on the command dependence graph 106 starting at the guarded command 112 (e.g., the guarded command to be tested) to yield a subgraph of guarded commands on which the guarded command 112 depends, and can topologically sort the subgraph to yield the sequence of guarded commands 302. In this example, the guarded command 112 depends from both the guarded command 110 and the guarded command 108. Thus, the guarded command 112 can be listed in the sequence of guarded commands 302 after both the guarded command 110 and the guarded command 108 (e.g., the guarded command 112 can be listed last in the sequence of guarded commands 302). Also, in this example, the guarded command 110 depends from the guarded command 108. Thus, the guarded command 110 can be listed in the sequence of guarded commands 302 after the guarded command 108 (e.g., the guarded command 110 can be listed in the middle of the sequence of guarded commands 302 so as to be after the guarded command 108 and before the guarded command 112). As explained herein, various embodiments of the invention can analyze the sequence of guarded commands 302 to generate the query language query 126.

As shown in FIG. 3, the test dataset generation system 102 can, in some cases, comprise the initialization component 304. In various embodiments, the initialization component 304 can initialize the query language query 126. In various aspects, the initialization component 304 can initially generate the query language query 126 as an empty query language query (e.g., a query language query shell having an initially empty SELECT clause, an initially empty FROM clause, and/or an initially empty WHERE clause). In various instances, the initialization component 304 can initialize the SELECT clause of the query language query 126 by inserting into the SELECT clause one or more types of data entries/fields to be queried. In various cases, the types of data entries/fields to be queried can depend on the types, structures, and/or organizations of the one or more data tables 104. In some cases, the one or more data tables 104 can be organized according to rows, in which case the initialization component 304 can insert into the SELECT clause an indication that rows in the one or more data tables 104 are to be queried/selected. In some cases, the one or more data tables 104 can be organized according to columns, in which case the initialization component 304 can insert into the SELECT clause an indication that columns in the one or more data tables 104 are to be queried/selected. In various instances, the initialization component 304 can initialize the FROM clause of the query language query 126 by inserting into the FROM clause one or more names and/or identification numbers of the one or more data tables 104. In various aspects, the initialization component 304 can initialize the WHERE clause of the query language query 126 by inserting into the WHERE clause conditions that are listed and/or specified in a guard clause of the guarded command to be tested. To continue the above example where the guarded command 112 is to be tested, the initialization component 304 can insert into the WHERE clause of the query language query 126 all conditions that are specified in the guard clause (e.g., the IF clause/portion, the WHEN clause/portion, the conditions clause/portion, and/or the propositions clause/portion) of the guarded command 112.

As shown in FIG. 3, the test dataset generation system 102 can, in some cases, comprise the transformation component 306. In various embodiments, the transformation component 306 can transform conditions in the WHERE clause of the query language query 126 based on the sequence of guarded commands 302. Specifically, in various embodiments, the transformation component 306 can, starting at the guarded command to be tested, traverse backward one step in the sequence of guarded commands 302 so as to consider a guarded command on which the guarded command to be tested depends. In various aspects, the transformation component 306 can determine whether any variable used in any condition specified in the WHERE clause of the query language query 126 is assigned in the command clause of the guarded command under consideration. If so, the transformation component can, in various cases, replace the variable in the WHERE clause of the query language query 126 with the corresponding assignment specified in the command clause of the guarded command under consideration and can insert into the WHERE clause of the query language query 126 all conditions specified in the guard clause of the guarded command under consideration. In various instances, the transformation component 306 can remove any duplicate and/or tautological (e.g., always-true) conditions from the WHERE clause of the query language query 126. In some cases, the transformation component 306 can check for inconsistent conditions in the WHERE clause of the query language query 126 (e.g., conditions that cannot logically be satisfied simultaneously). In various aspects, the transformation component 306 can then traverse backward another step in the sequence of guarded commands 302 so as to consider another guarded command on which the guarded command to be tested depends, and can continue in this fashion until all guarded commands in the sequence of guarded commands 302 have been considered. In various instances, this procedure can ensure that the WHERE clause of the query language query 126 contains all conditions on which the guarded command to be tested depends, either directly and/or transitively.

To continue the above example where the guarded command 112 is to be tested, the transformation component 306 can, beginning from the guarded command 112, traverse backward one step in the sequence of guarded commands 302 so as to consider the guarded command 110. The transformation component 306 can, in various cases, determine whether any variable used in any condition of the WHERE clause of the query language query 126 is assigned in the command clause of the guarded command 110. If so, the transformation component 306 can replace the variable in the WHERE clause of the query language query 126 with the assignment specified in the command clause of the guarded command 110, and can insert into the WHERE clause of the query language query 126 all conditions specified in the guard clause of the guarded command 110.

The transformation component 306 can, in various cases, remove duplicate or tautological conditions and check for inconsistencies in the WHERE clause. In various instances, the transformation component 306 can traverse backward another step in the sequence of guarded commands 302 so as to consider the guarded command 108, and can proceed in this fashion until all guarded commands in the sequence of guarded commands 302 are considered.

As shown in FIG. 3, the test dataset generation system 102 can, in some cases, comprise the translation component 308. In various embodiments, the translation component 308 can convert the transformed conditions in the WHERE clause of the query language query 126 into query language syntax (e.g., this can be beneficial since the guarded commands can, in some cases, use custom functions in guard clauses and/or command clauses). In various cases, the translation component 308 can replace (e.g., via any suitable technique) custom functions present in the WHERE clause of the query language query 126 with analogous and/or equivalent functions written in the target query language syntax (e.g., which can be any suitable SQL and/or non-SQL query language syntax that is recognized and/or accepted by the one or more data tables 104). As mentioned above, some embodiments of the invention can be implemented with non-SQL querying paradigms (e.g., such that test dataset generation system 102 can generate a non-SQL query to be executed on a database that does not recognize and/or accept SQL syntax). In such cases, the translation component 308 can covert the transformed conditions of the WHERE clause into the suitable target syntax recognized and/or accepted by the database. In various aspects, the translation component 308 can leverage any suitable mapping and/or technique that maps custom functions used in the guarded commands 108-112 to equivalent and/or analogous functions in the target query language syntax.

The following discussion explains example, non-limiting details of an algorithm for transforming conditions of a WHERE clause of a query language query based on guarded commands to facilitate automated generation of relevant and adequate test datasets based on guarded commands in accordance with one or more embodiments described herein. In various embodiments, the test dataset generation system 102 can, via the query generation component 120, implement the described algorithm.

In various embodiments, the algorithm can be implemented by the transformation component 306. In various cases, the algorithm can begin with the transformation component 306 considering a guarded command on which the guarded command to be tested depends (e.g., after one backward traversal in the sequence of guarded commands 302 when starting at the guarded command to be tested). For purposes of explanation, the guarded command under consideration can be referred to as the "current guarded command."

In various embodiments, the algorithm can include a for-loop that iterates through each condition C that is listed and/or specified in the WHERE clause of the query language query 126 (e.g., after initialization via the initialization component 304). For each condition C, the algorithm can include another for-loop that iterates through each variable V that is listed and/or specified in the condition C. For each variable V, the algorithm can include an if-loop that checks whether the variable V is assigned in a command clause of a current guarded command. If so, the algorithm can include replacing the variable V in the condition C in the WHERE clause with the corresponding assignment (e.g., right-hand-side expression) that is specified in the command clause of the current guarded command. In various instances, this can be referred to as transforming the condition C. In various aspects, the nested for-loops can then end.

In various cases, the algorithm can include an if-loop that determines whether any condition C was transformed as described above. If so, the algorithm can include inserting into the WHERE clause all conditions that are listed and/or specified in a guard clause of the current guarded command. In various cases, the algorithm can include removing from the WHERE clause duplicate and/or tautological and/or inconsistent conditions.

In various instances, the algorithm can include selecting a new current guarded command by traversing backward one step in a topologically-sorted sequence of guarded commands (e.g., the sequence of guarded commands 302). In various aspects, the algorithm can repeat until all guarded commands in the topologically-sorted sequence are considered. It should be appreciated that the particular organization and/or syntax of the algorithm described above are exemplary and non-limiting.

FIGS. 4-14 illustrate example, non-limiting diagrams that depict how conditions of a WHERE clause of a query language query are transformed based on guarded commands to facilitate automated generation of relevant and adequate test datasets in accordance with one or more embodiments described herein. In other words, the FIGS. 4-14 depict an extended, non-limiting example that illustrates embodiments of the invention in a step-by-step fashion (e.g., illustrating exemplary implementation of the above-described algorithm).

Figure 4:
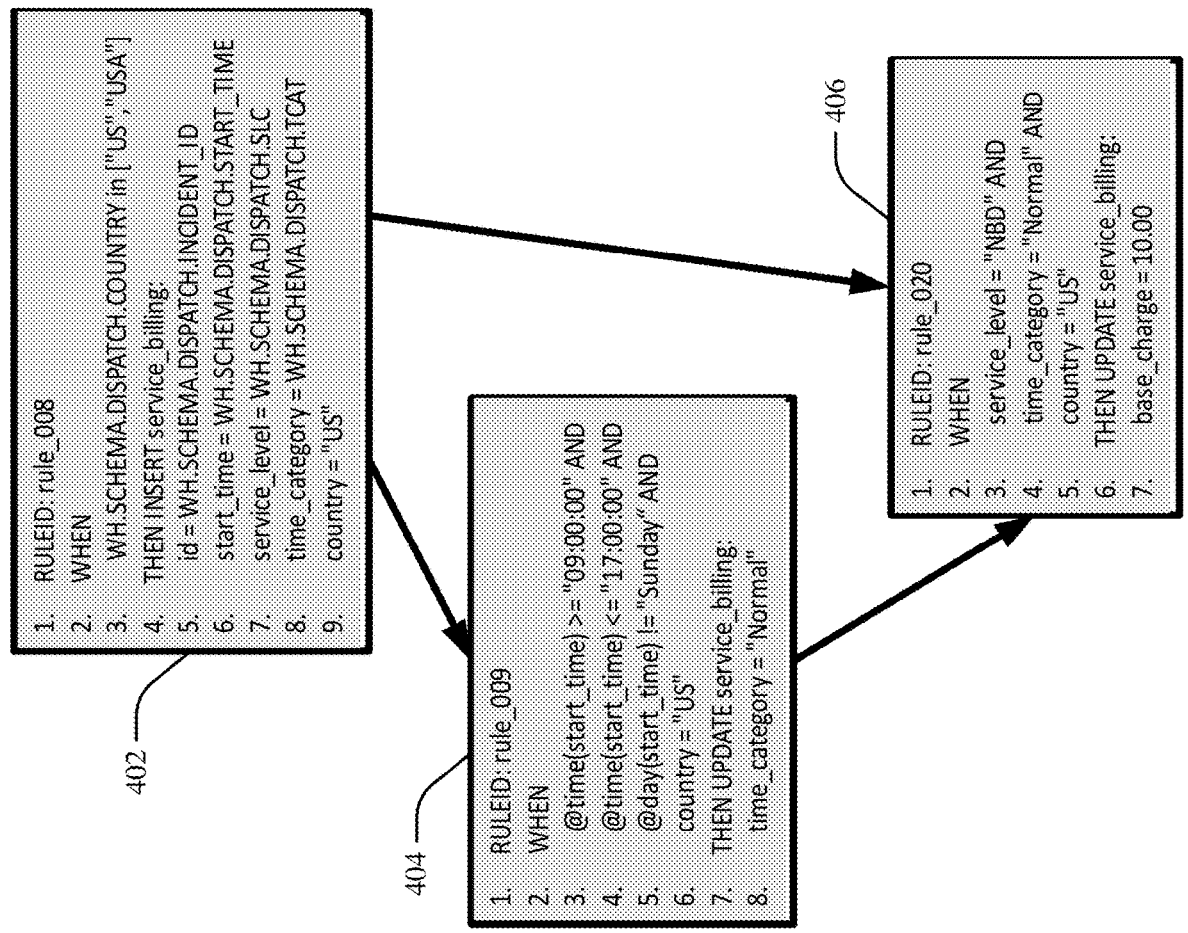
FIGS. 4-14 illustrate example, non-limiting diagrams that depict how conditions of a WHERE clause of a query language query are transformed based on guarded commands to facilitate automated generation of relevant and adequate test datasets in accordance with one or more embodiments described herein.

FIG. 4 illustrates an example, non-limiting command dependence graph 400 that includes three guarded commands (e.g., guarded commands 402-406). As shown, the guarded commands 402-406 can govern billing information in relation to the delivery of technology support services (e.g., as shown, the guard clauses and the command clauses of the guarded commands 402-406 can pertain to the time of day and/or day of week when technology support services are delivered, can include country in which technology support services are delivered, and/or can include amounts charged for technology support services delivered). In various aspects, the guarded commands 402-406 can have guard clauses that read data from a data source table (e.g., the one or more data tables 104). In the example shown, the data source table can be WH.SCHEMA.DISPATCH (e.g., where "SCHEMA" can indicate the name and/or identify of the customer to whom technology support services are delivered). In various instances, the guarded commands 402-406 can have command clauses that write and/or insert data to a data model table (e.g., which can be different from the one or more data tables 104). In the example shown, the data model table can be service_billing (e.g., which can store and/or hold generated billing items corresponding to the client named SCHEMA).

As shown in the command dependence graph 400, the guarded command 404 depends from the guarded command 402, because the guard clause of the guarded command 404 reads and/or uses the variables "start_time" and "country" which are defined by the command clause of the guarded command 402. Similarly, the guarded command 406 depends from the guarded command 404, because the guard clause of the guarded command 406 reads and/or uses the variable "time_category" which is defined by the command clause of the guarded command 404. Moreover, the guarded command 406 also depends from the guarded command 402, because the guard clause of the guarded command 406 reads and/or uses the variables "service_level" and "country" which are defined by the command clause of the guarded command 402. For this extended example, suppose that the guarded command 406 is to be tested.

Figure 5:
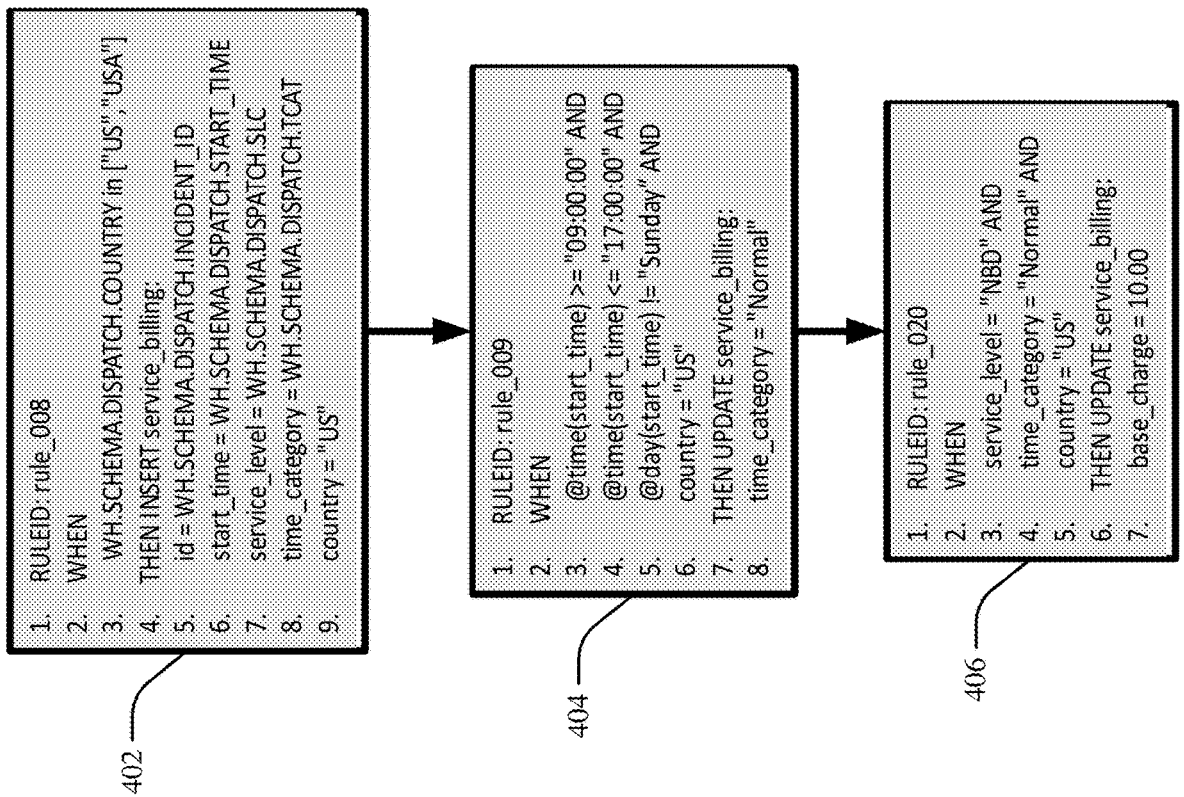

FIG. 5 illustrates a sequence of guarded commands 500 that can be generated by the graph component 118 (e.g., via reverse traversal and topological sorting) based on the command dependence graph 400. As shown, the guarded commands 402-406 are now linearly ordered based on their inter-dependencies.

Figure 6:
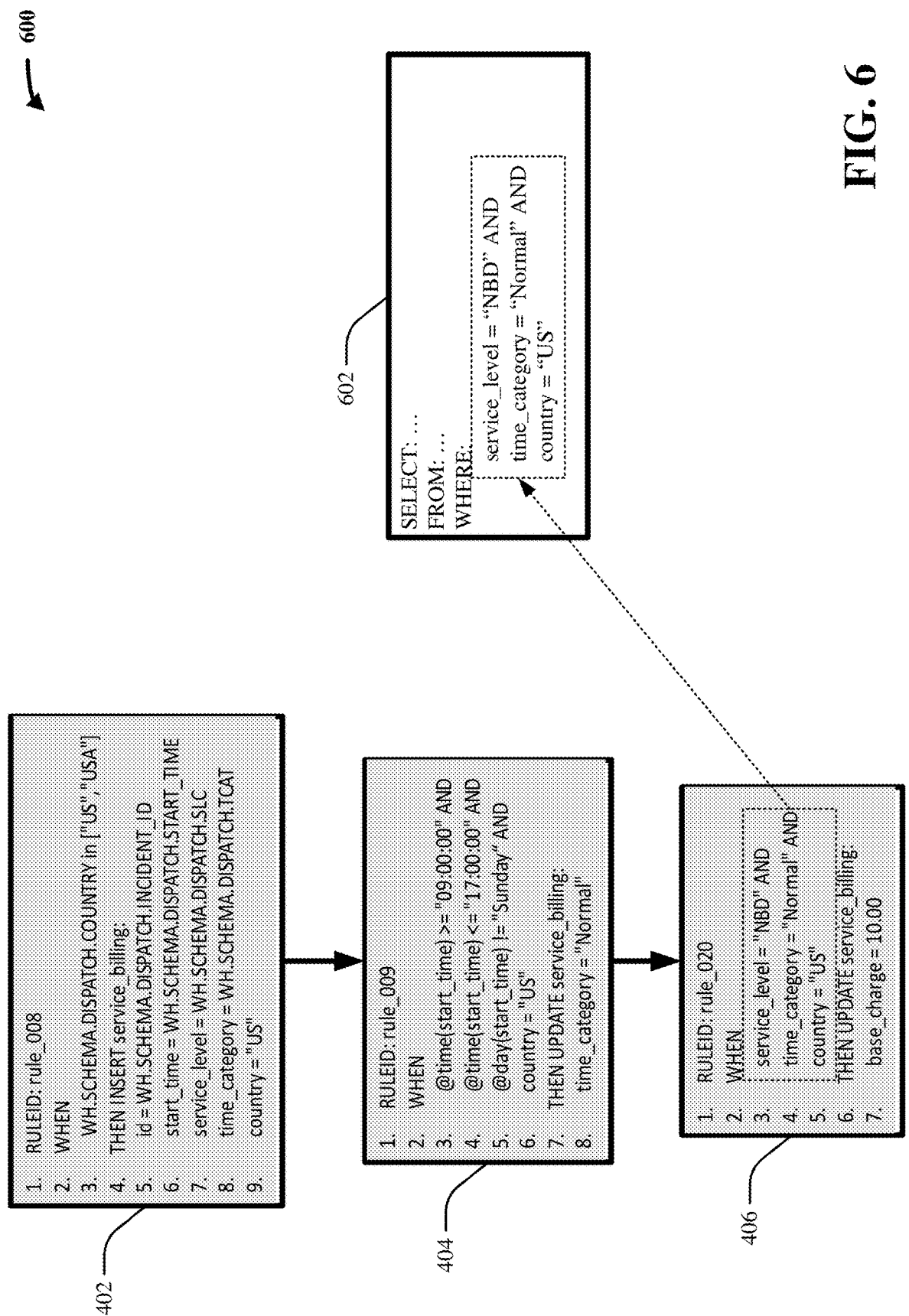

FIG. 6 illustrates an initialized query language query 602 that can be generated by the initialization component 304. As shown, since the guarded command 406 is to be tested, the initialization component 304 can initialize the query language query 602 by inserting into the WHERE clause of the query language query 602 some and/or all of the conditions listed in the guard clause of the guarded command 406.

Figure 7:
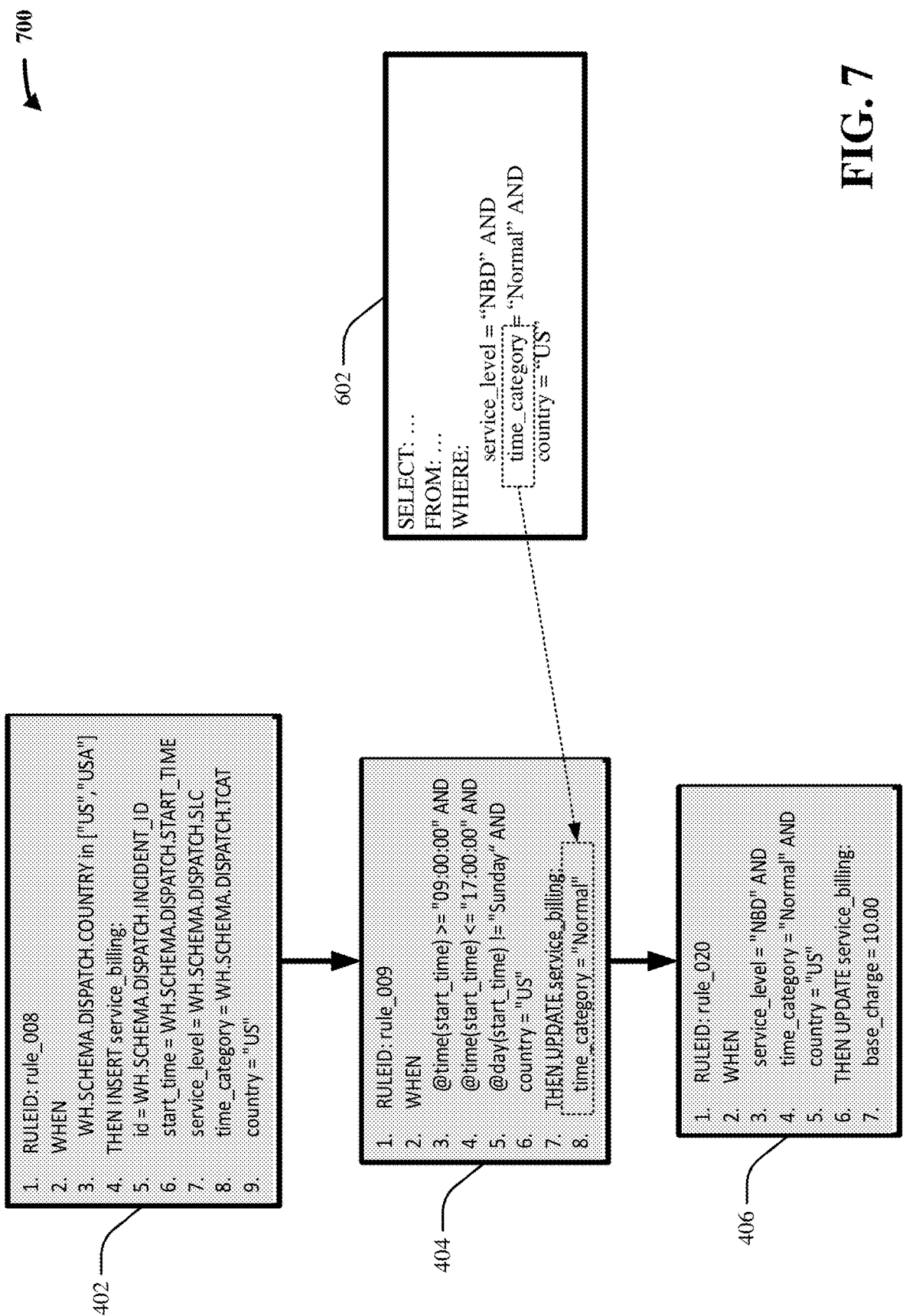

FIG. 7 illustrates at a high level how, after initialization of the query language query 602, the transformation component 306 can traverse backward one step in the sequence of guarded commands 500 so as to consider the guarded command 404. As explained above, the transformation component 306 can determine whether any variable in any condition of the WHERE clause of the query language query 602 is assigned in a command clause of the guarded command 404 (e.g., the guarded command now under consideration). As shown, the WHERE clause of the query language query 602 recites the variable "time_category," which is assigned in the command clause of the guarded command 404.

Figure 8:
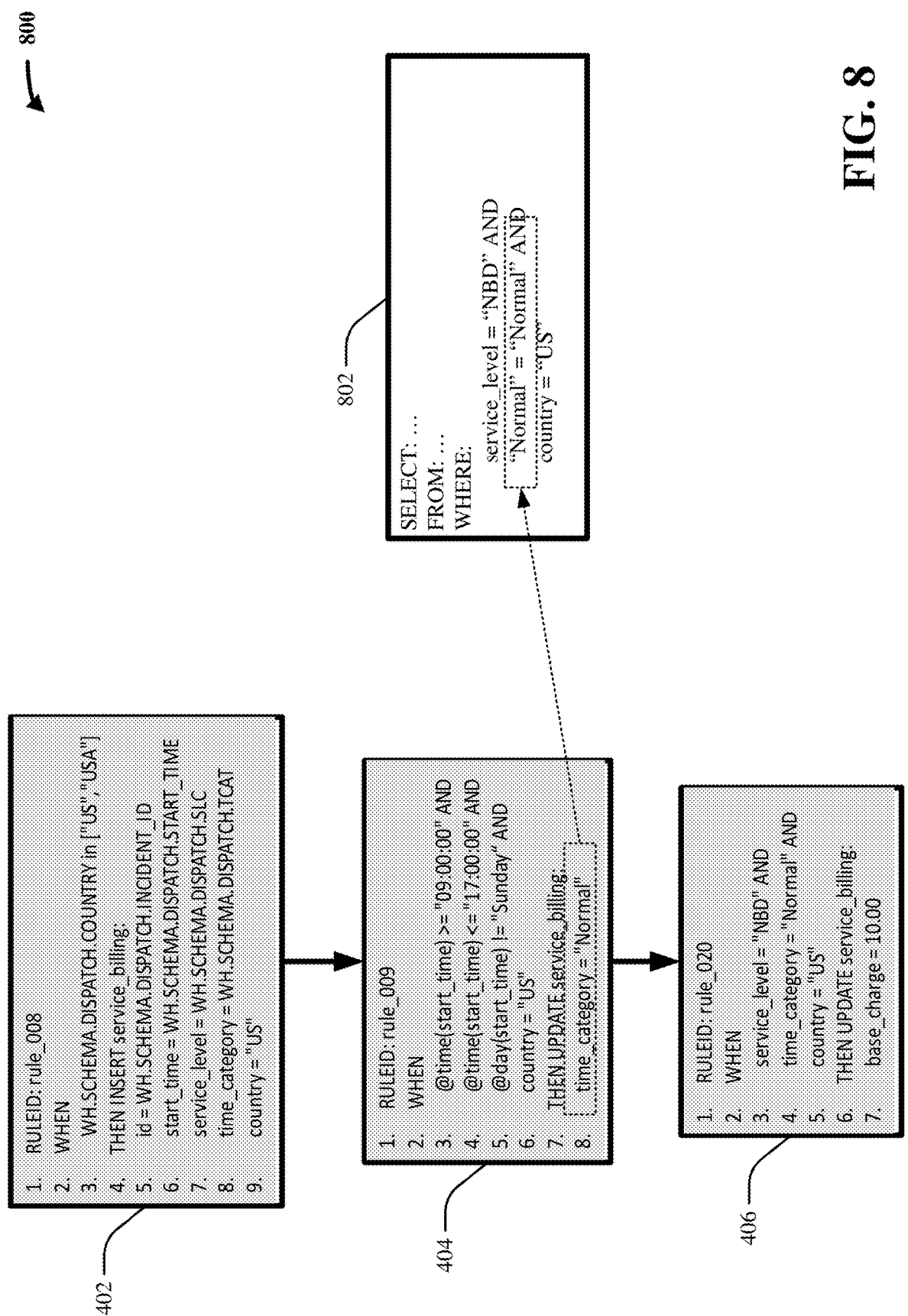

FIG. 8 illustrates how the transformation component 306 can transform the conditions of the WHERE clause based on specified assignments in the command clause of the guarded command 404. As explained above, if any variable of any condition of the WHERE clause is assigned in a command clause of the guarded command under consideration, the transformation component 306 can replace the variable in the WHERE clause with the corresponding assignment (e.g., the right-hand-side of the assignment) specified in the command clause of the guarded command under consideration. This can, in various cases, be referred to as transforming a condition of the WHERE clause of the query language query. As shown, since the WHERE clause recited (as shown in FIG. 7) the variable "time_category," and since the variable "time_category" is assigned in the command clause of the guarded command 404, the transformation component 306 can replace the variable "time_category" in the WHERE clause with the corresponding assignment (e.g., right-hand-side expression, which in this case is "Normal") specified in the command clause of the guarded command 404. The result can be the transformed query language query 802.

Figure 9:
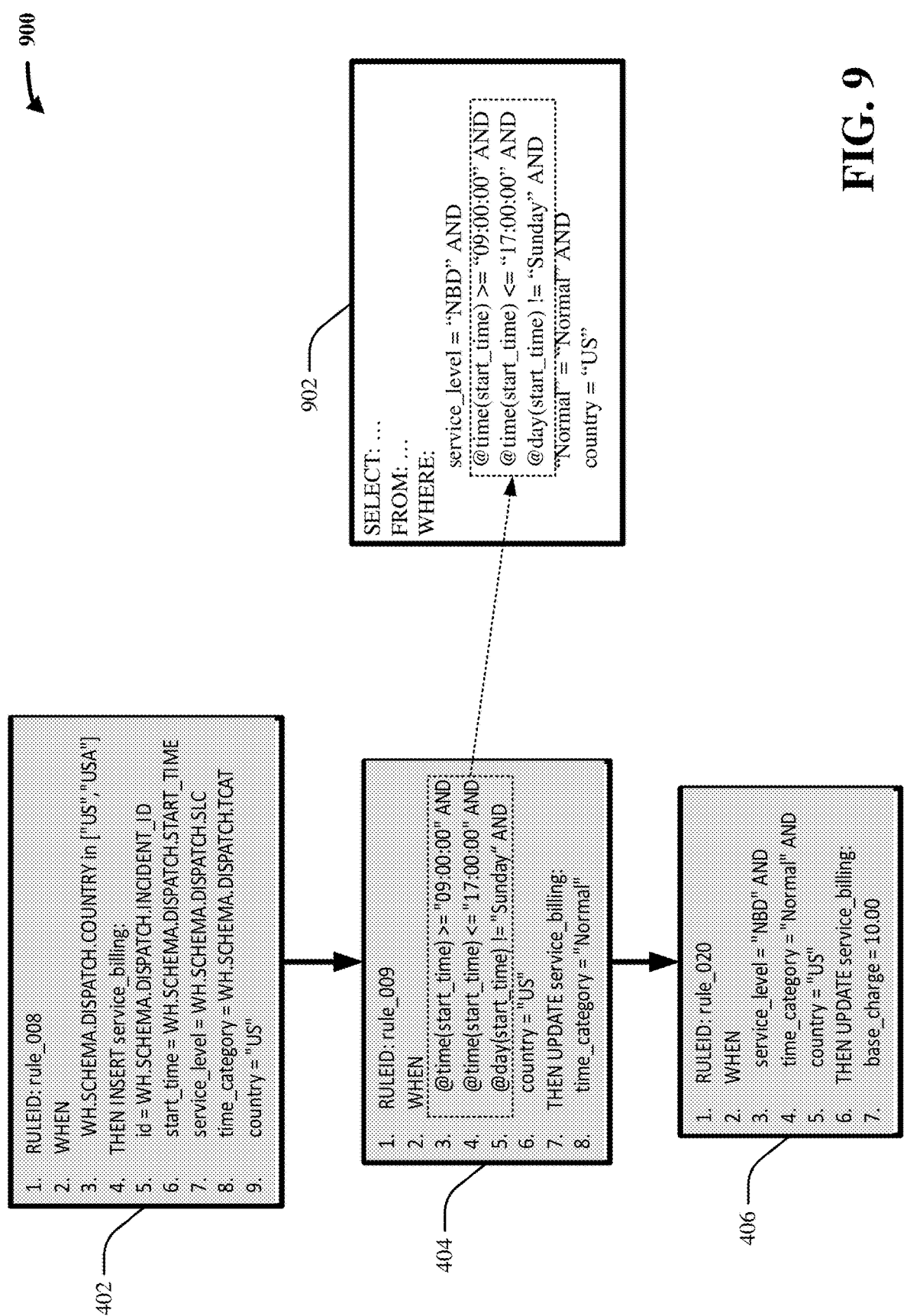

FIG. 9 illustrates how the transformation component 306 can further transform the conditions of the WHERE clause based on the guard clause of the guarded command 404. As explained above, if any condition of the WHERE clause is transformed based on an assignment specified in a command clause of the guarded command under consideration, the transformation component 306 can insert into the WHERE clause all conditions of the guard clause of the guarded command under consideration. As shown, since the WHERE clause was transformed based on the command clause of the guarded command 404 (e.g., the variable "time_category" was replaced with the assignment "Normal" specified in the command clause of the guarded command 404), the transformation component 306 can insert into the WHERE clause all the conditions specified in the guard clause of the guarded command 404. The result can be the transformed query language query 902.

Figure 10:
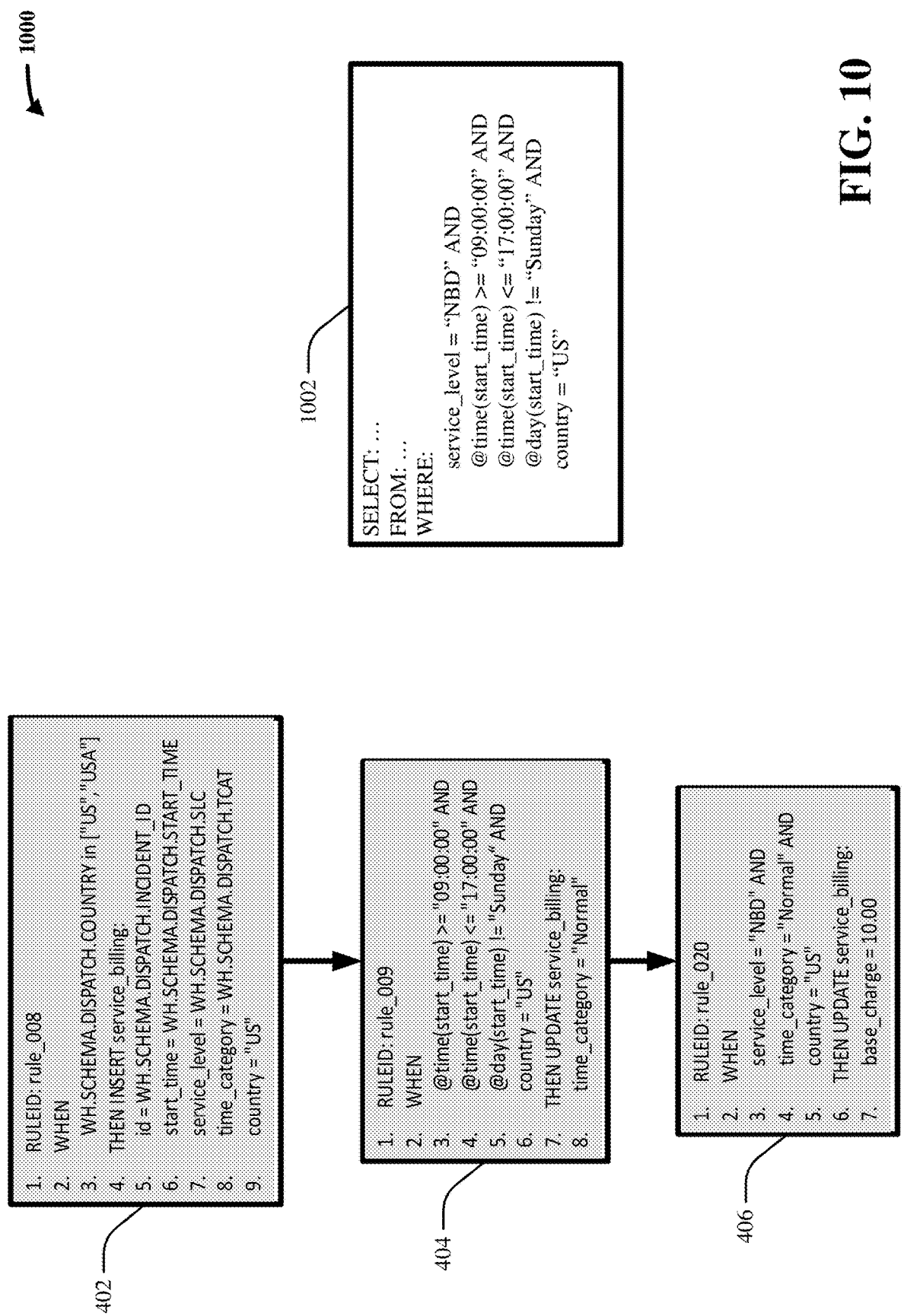

FIG. 10 illustrates how the transformation component 306 can remove from the WHERE clause duplicate and/or tautological conditions. As shown in this example, there are no duplicated/repeated conditions in the WHERE clause that should be removed. As shown in this example, the condition "Normal"="Normal" is a tautology (e.g., it is always true and thus adds no value), and so the transformation component 306 can remove it from the WHERE clause. The result can be the transformed query language query 1002. Moreover, as explained above, the transformation component 306 can check whether there are any inconsistent conditions (e.g., conditions which cannot be simultaneously satisfied) in the WHERE clause. Since there are none in the shown example, an inconsistency alert need not be sent to an operator.

Figure 11:
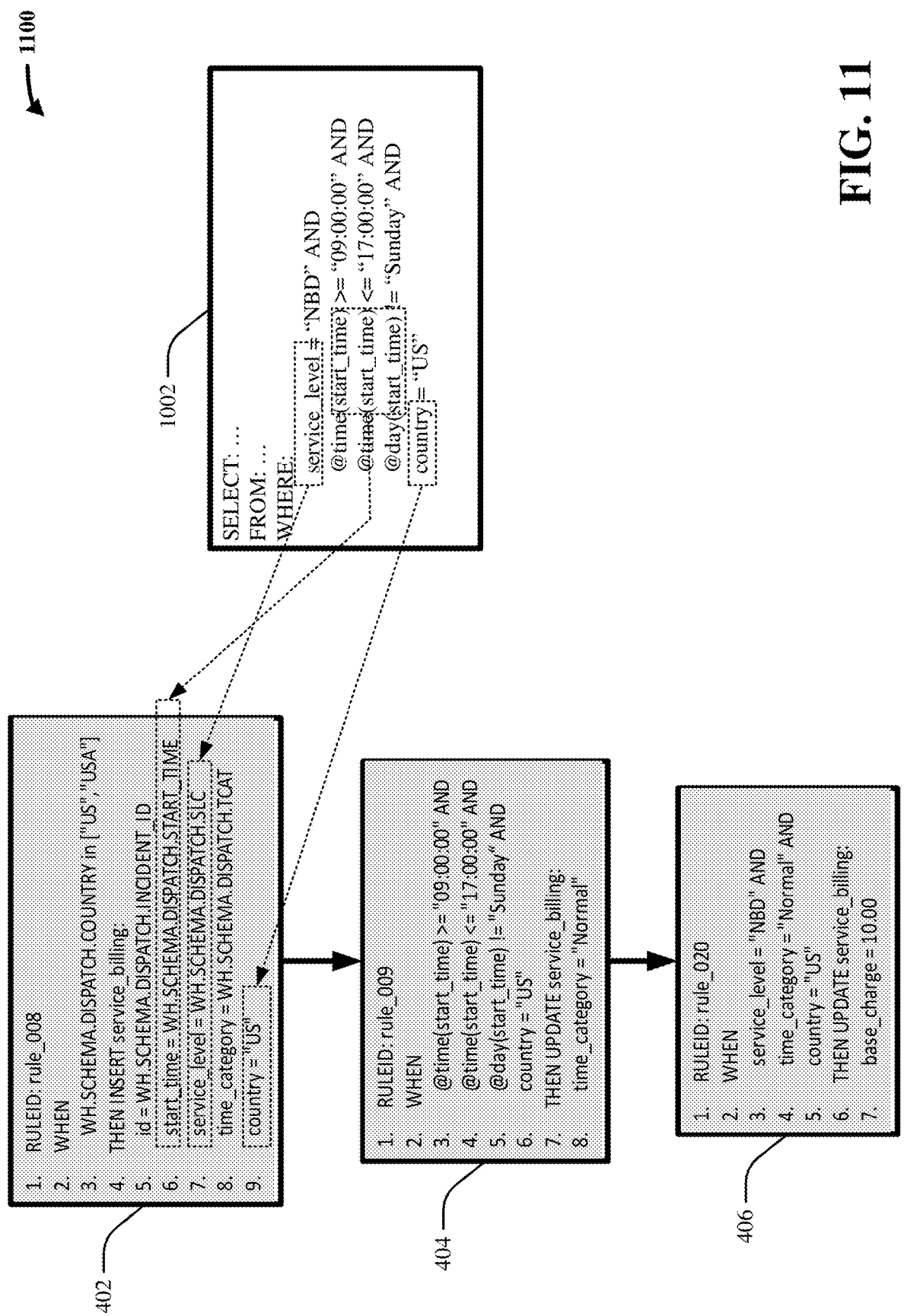

FIG. 11 illustrates how the transformation component 306 can traverse backward another step in the sequence of guarded commands 500, so as to consider the guarded command 402. As explained above, the transformation component 306 can determine whether any variable in any condition of the WHERE clause of the query language query 1002 is assigned in a command clause of the guarded command 402 (e.g., the guarded command now under consideration). As shown, the WHERE clause of the query language query 1002 recites the variable "service_level," the variable "start_time," and the variable "country," which are all assigned in the command clause of the guarded command 402.

Figure 12:
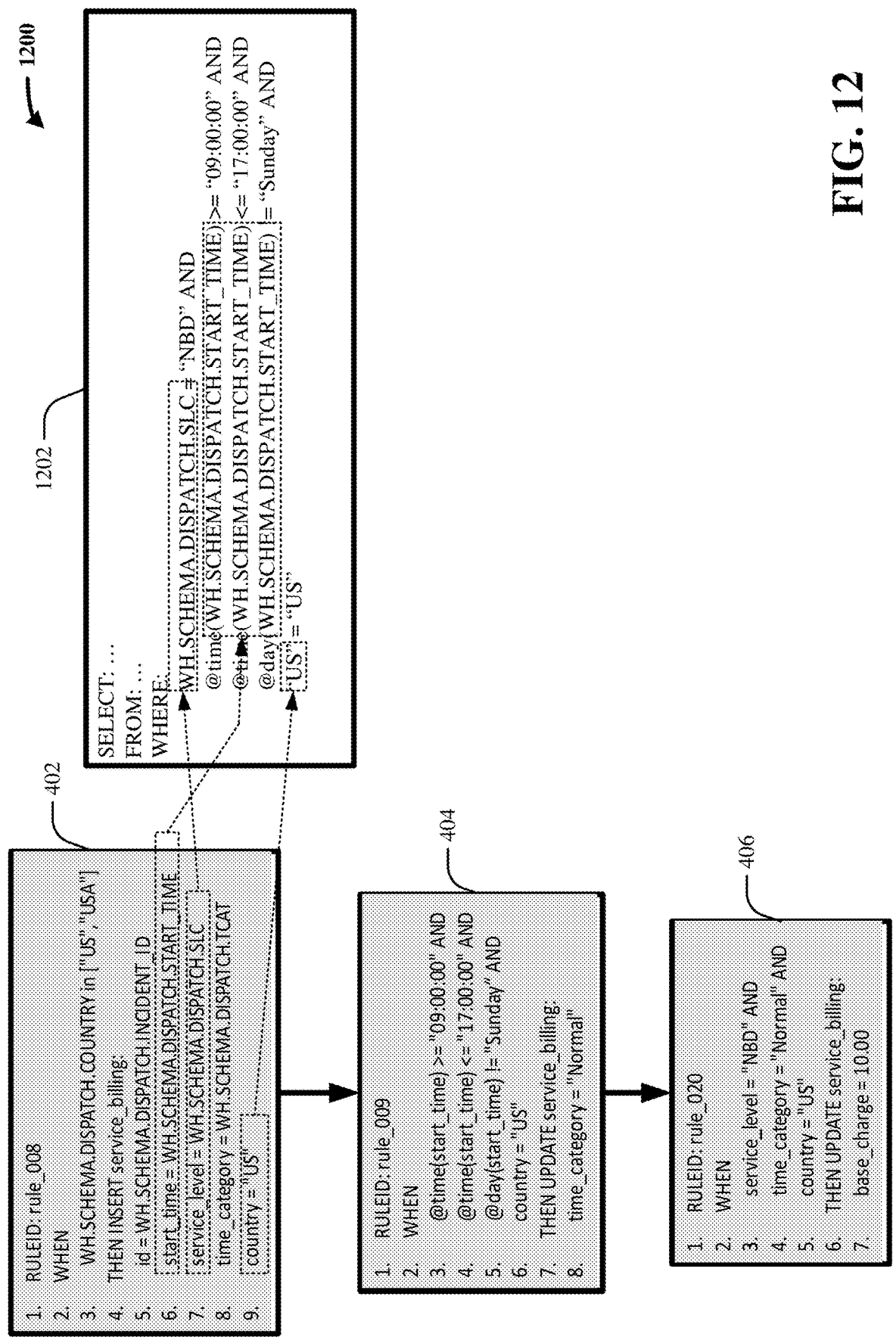

FIG. 12 illustrates how the transformation component 306 can transform the conditions of the WHERE clause based on specified assignments in the command clause of the guarded command 402. As explained above, if any variable of any condition of the WHERE clause is assigned in a command clause of the guarded command under consideration, the transformation component 306 can replace the variable in the WHERE clause with the corresponding assignment (e.g., the right-hand-side of the assignment) specified in the command clause of the guarded command under consideration. This can, in various cases, be referred to as transforming a condition of the WHERE clause. As shown, since the WHERE clause recited (as shown in FIG. 11) the variable "service_level," the variable "start_time," and the variable "country," and since the variable "service_level," the variable "start_time," and the variable "country" are assigned in the command clause of the guarded command 402, the transformation component 306 can replace the variable "service_level," the variable "start_time," and the variable "country" in the WHERE clause with the corresponding assignments specified in the command clause of the guarded command 402 (e.g., "service_level" replaced with "WH.SCHEMA.DISPATCH.SLC," "start_time" replaced with "WH.SCHEMA.DISPATCH.START_TIME," and "country" replaced with "US"). The result can be the transformed query language query 1202.

Figure 13:
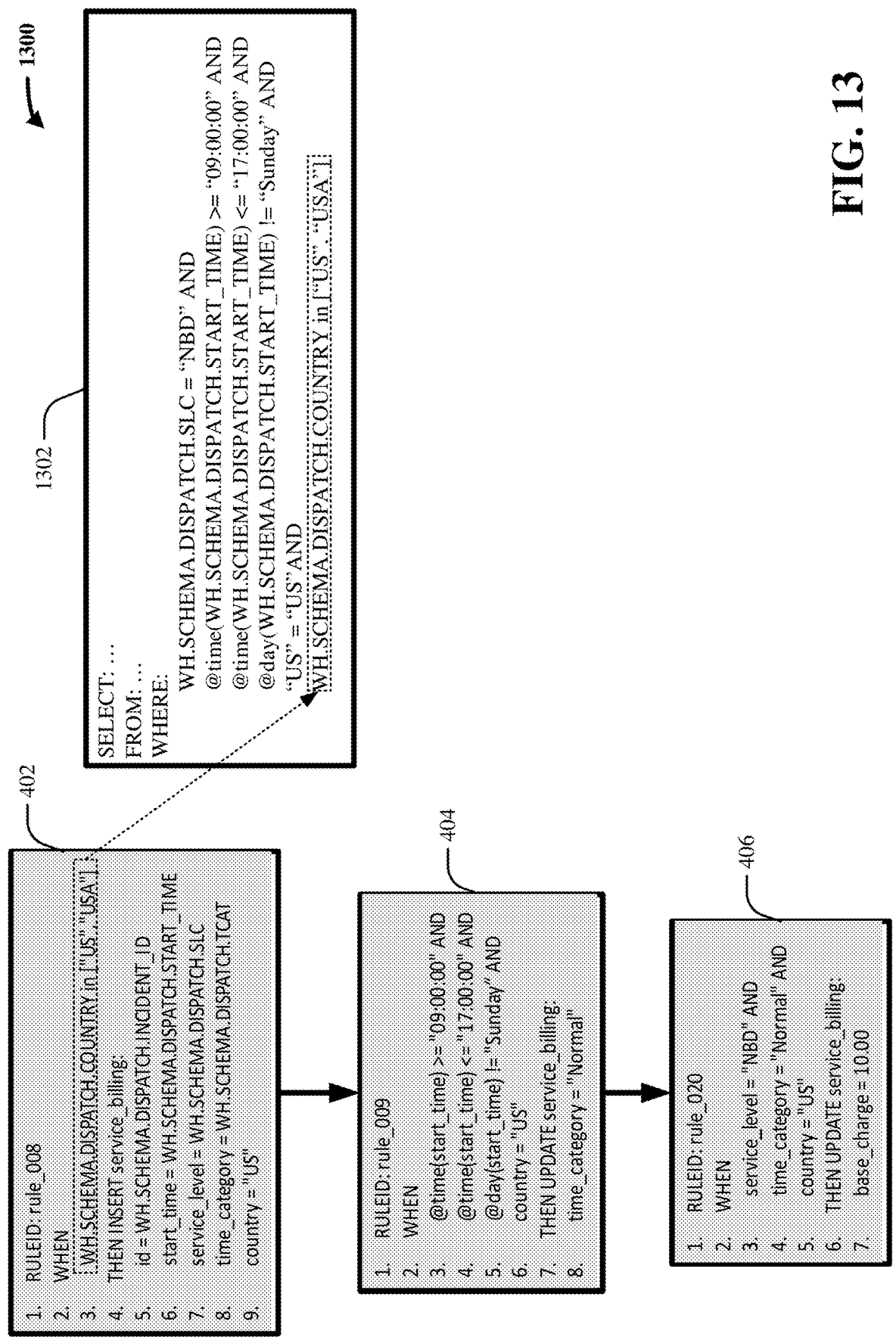

FIG. 13 illustrates how the transformation component 306 can further transform the conditions of the WHERE clause based on the guard clause of the guarded command 402. As explained above, if any condition of the WHERE clause is transformed based on an assignment specified in a command clause of the guarded command under consideration, the transformation component 306 can insert into the WHERE clause all conditions of the guard clause of the guarded command under consideration. As shown, since the WHERE clause was transformed based on the command clause of the guarded command 402 (e.g., "service_level" replaced with "WH.SCHEMA.DISPATCH.SLC," "start_time" replaced with "WH.SCHEMA.DISPATCH.START_TIME," and "country" replaced with "US"), the transformation component 306 can insert into the WHERE clause all the conditions specified in the guard clause of the guarded command 402. The result can be the transformed query language query 1302.

Figure 14:
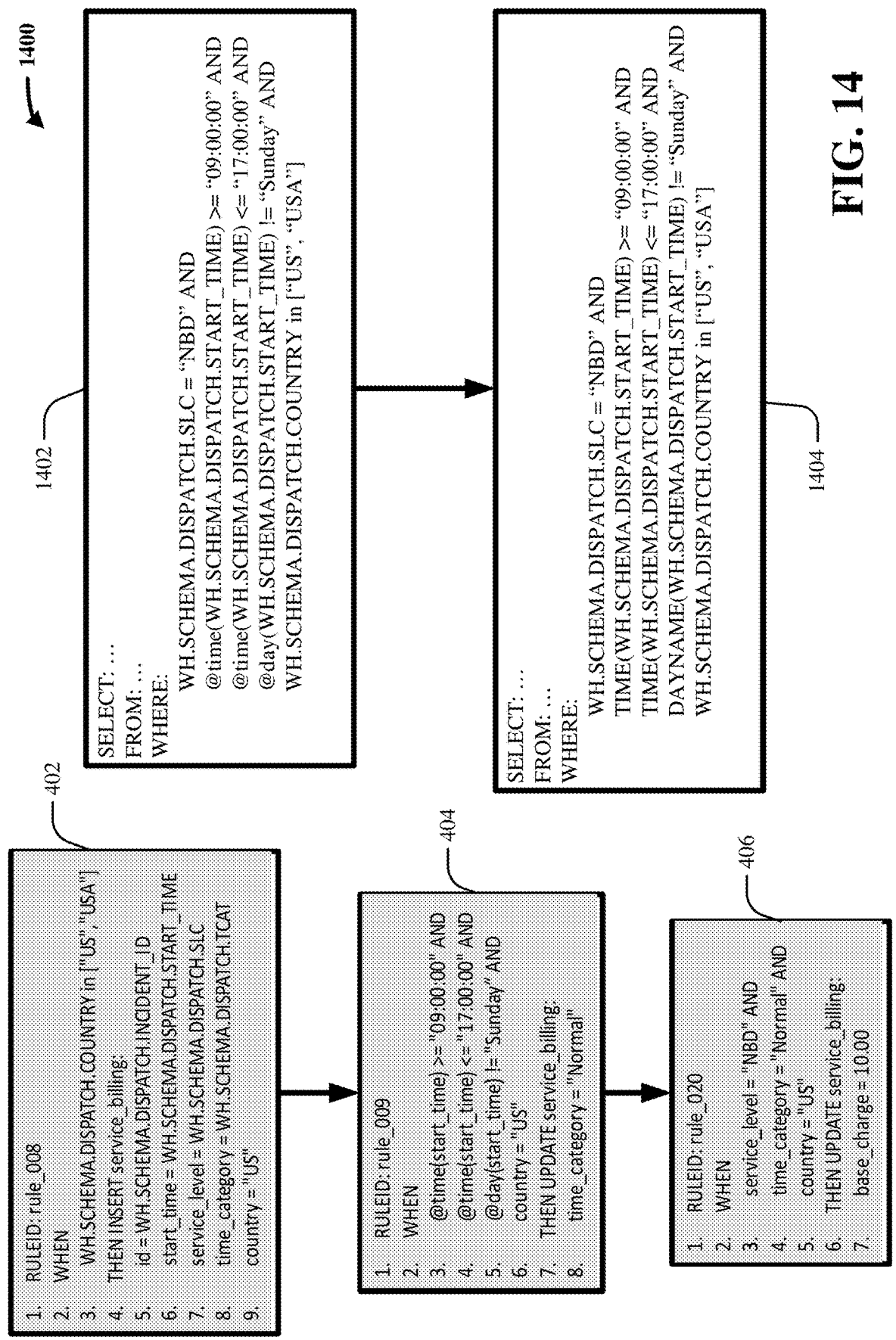

FIG. 14 illustrates how the transformation component 306 can remove from the WHERE clause duplicate and/or tautological conditions and can convert the WHERE clause into query language syntax. As shown in this example, there are no duplicated/repeated conditions in the WHERE clause that should be removed. As shown, the condition "US"="US" is a tautology (e.g., it is always true and thus adds no value), and so the transformation component 306 can remove it from the WHERE clause. The result can be the transformed query language query 1402. Moreover, as explained above, the transformation component 306 can check whether there are any inconsistent conditions (e.g., conditions which cannot be simultaneously satisfied) in the WHERE clause. Since there are none in the shown example, an inconsistency alert need not be sent to an operator. Moreover, since all guarded commands in the sequence of guarded commands 500 have been considered, the above procedure by the transformation component 306 can cease.

Also as shown in FIG. 14, the translation component 308 can convert the transformed conditions of the WHERE clause into the target query language syntax, which can include, in various embodiments, replacing custom functions with equivalent and/or analogous functions in the target query language by any suitable mapping technique known in the art. The result can be the query language query 1404 written in query language syntax. As explained above, in various embodiments, any suitable query language syntax can be implemented, depending on the query languages accepted and/or recognized by the data tables and/or databases to be queried.

Figure 15:
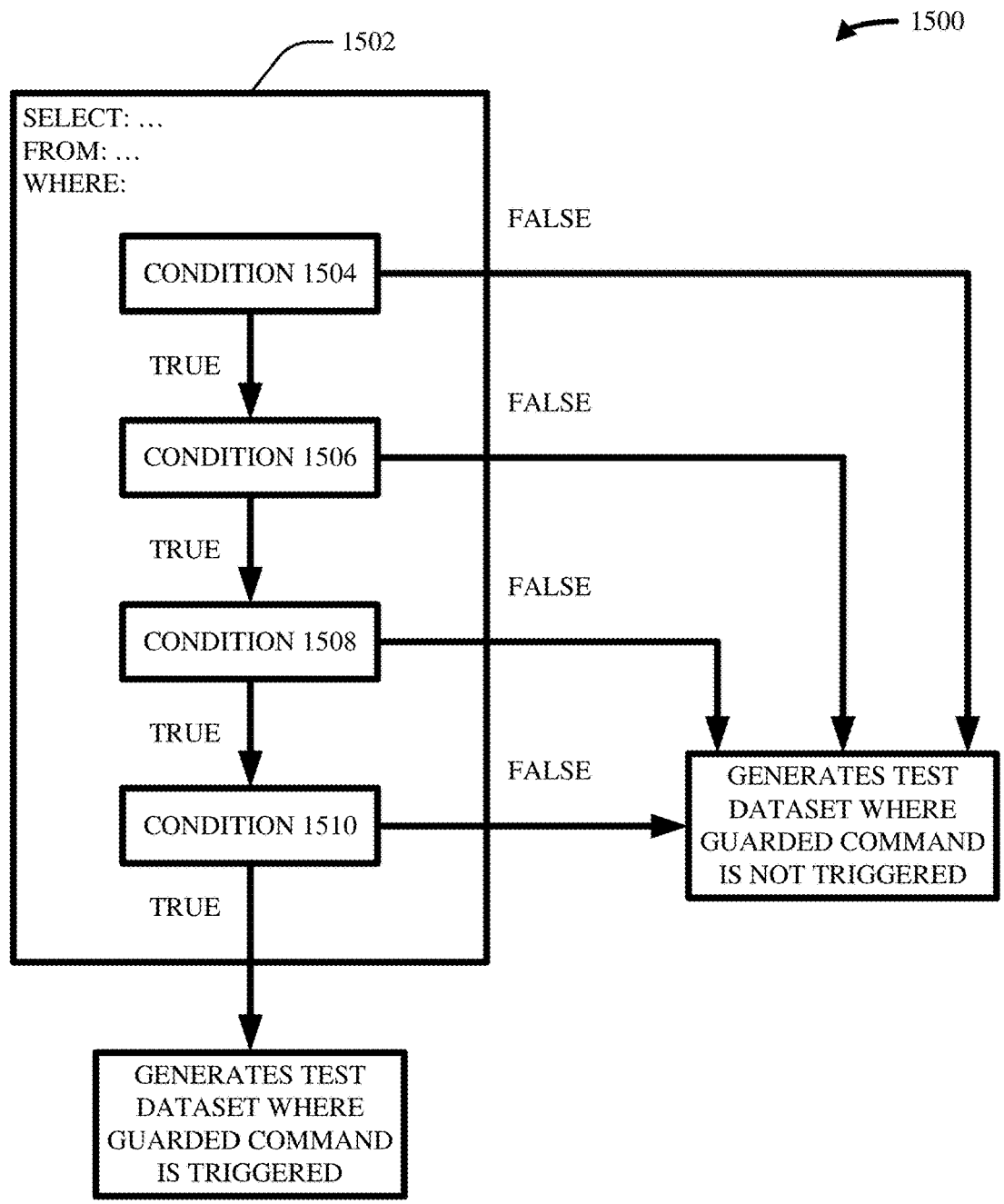
FIG. 15 illustrates a block diagram of an example, non-limiting flow graph representation of a WHERE clause of a query language query that facilitates automated generation of relevant and adequate test datasets based on guarded commands in accordance with one or more embodiments described herein.

FIG. 15 illustrates a block diagram of an example, non-limiting flow graph representation of a WHERE clause of a query language query that can facilitate automated generation of relevant and adequate test datasets based on guarded commands in accordance with one or more embodiments described herein.

In various embodiments, the query language query 1502 can be the finalized, transformed, and/or translated result generated by the query generation component 120 and can, as shown, have four (in this non-limiting example) conditions in its WHERE clause (e.g., conditions 1504-1510). In various embodiments, the test dataset generation system 102 can measure adequacy of condition coverage of test datasets in terms of branch coverage in the flow graph representation 1500. As shown, the flow graph representation 1500 depicts the five possible ways in which a test dataset can interact with the query language query 1502: (1) the test dataset can fail to satisfy the condition 1504; (2) the test dataset can satisfy the condition 1504 but fail to satisfy the condition 1506; (3) the test dataset can satisfy the conditions 1504-1506 but fail to satisfy the condition 1508; (4) the test dataset can satisfy the conditions 1504-1508 but fail to satisfy the condition 1510; or (5) the test dataset can satisfy all the conditions 1504-1510.

In various embodiments, as explained above, the test dataset generation system 102 can generate multiple query language queries by selectively negating conditions in the "all-true" query language query. Here, the "all-true" query language query can be a query language query the WHERE clause of which recites the conditions 1504-1510 as is. As shown, the "all-true" query language query can generate a test dataset where the guarded command is triggered (e.g., since all conditions would be satisfied by the "all-true" query language query). However, since the query language query 1502 has four conditions in its WHERE clause, four additional query language queries can be generated by selectively negating the conditions 1504-1510 (e.g., negating the condition 1504 such that the generated test dataset does not satisfy the condition 1504, negating the condition 1506 such that the generated test dataset does not satisfy the condition 1506, negating the condition 1508 such that the generated test dataset does not satisfy the condition 1508, or negating the condition 1510 such that the generated test dataset does not satisfy the condition 1510). In any case, each of those four selectively negated query language queries can generate a test dataset that does not trigger the guarded command to be tested (e.g., since not all conditions of the guarded command would be satisfied). In various aspects, there can exist a set of values that trigger the guarded command (e.g., the "all-true" query language query), and for each WHERE clause condition C, there can exist a set of values that causes C to evaluate false and all conditions preceding C to evaluate true. This can help to ensure that the guarded command is tested in multiple scenarios where all and/or a subset of its conditions evaluate true. In various cases, more rigorous coverage criteria can be used (e.g., consideration of boundary values for WHERE conditions, and/or any other suitable criteria).

Figure 16:
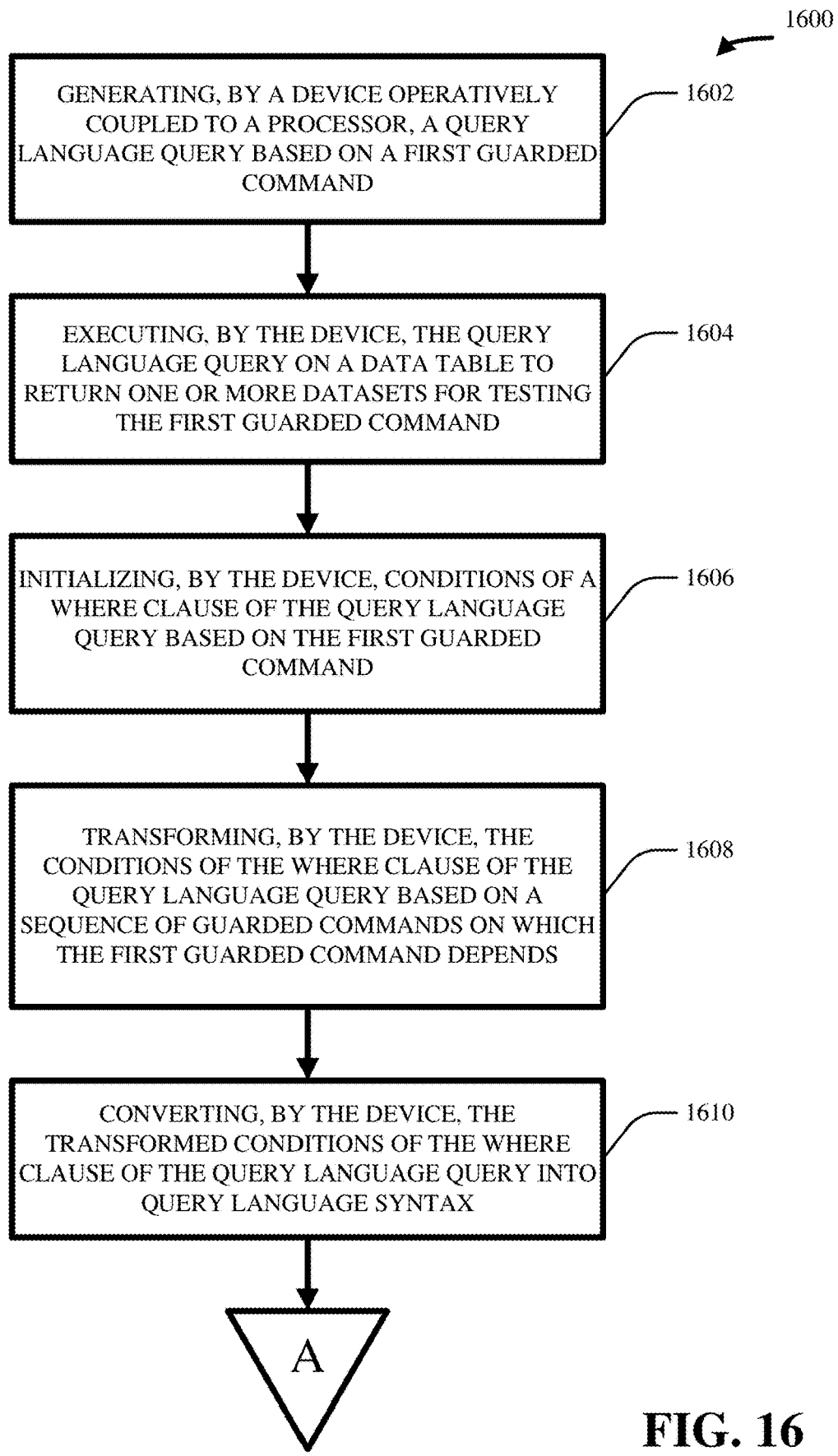
FIG. 16 illustrates a flow diagram of an example, non-limiting computer-implemented method that facilitates automated generation of relevant and adequate test datasets based on guarded commands in accordance with one or more embodiments described herein.

FIG. 16 illustrates a flow diagram of an example, non-limiting computer-implemented method 1600 that can facilitate automated generation of relevant and adequate test datasets based on guarded commands in accordance with one or more embodiments described herein.

In various embodiments, act 1602 can include generating, by a device operatively coupled to a processor (e.g., 120), a query language query (e.g., 126) based on a first guarded command (e.g., 112 and/or 406).

In various aspects, act 1604 can include executing, by the device (e.g., 122), the query language query on a data table (e.g., 104) to return one or more datasets (e.g., 128) for testing the first guarded command.

In various embodiments, act 1606 can include initializing, by the device (e.g., 304), conditions of a WHERE clause (e.g., 216) of the query language query based on the first guarded command.

In various aspects, act 1608 can include transforming, by the device (e.g., 306), the conditions of the WHERE clause of the query language query based on a sequence of guarded commands (e.g., 302 and/or 500) on which the first guarded command depends.

In various instances, act 1610 can include converting, by the device (e.g., 308), the transformed conditions of the WHERE clause of the query language query into query language syntax.

Figure 17:
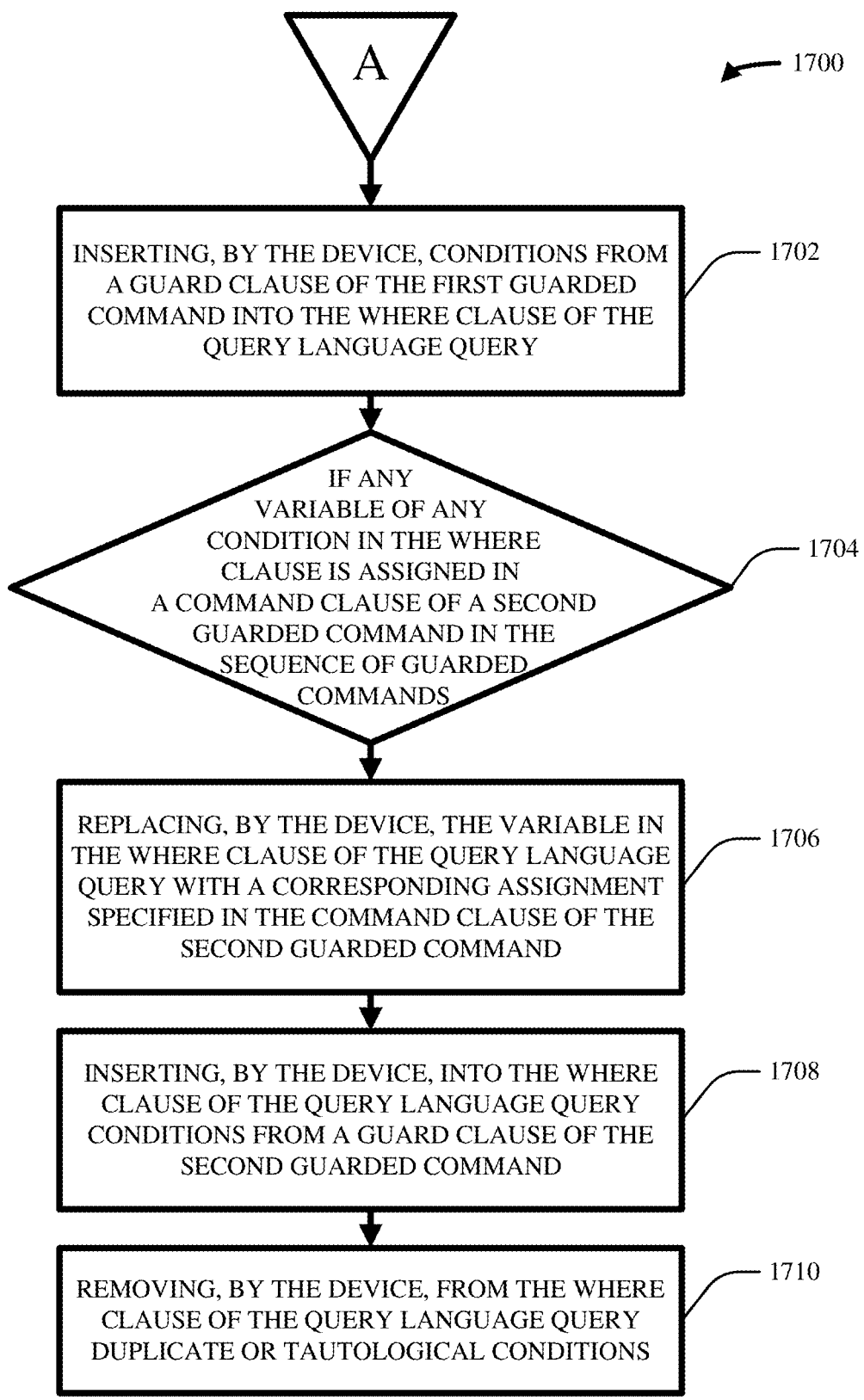
FIG. 17 illustrates a flow diagram of an example, non-limiting computer-implemented method that facilitates automated generation of relevant and adequate test datasets based on guarded commands in accordance with one or more embodiments described herein.

FIG. 17 illustrates a flow diagram of an example, non-limiting computer-implemented method 1700 that can facilitate automated generation of relevant and adequate test datasets based on guarded commands in accordance with one or more embodiments described herein.

In various embodiments, act 1702 can include inserting, by the device (e.g., 304), conditions from a guard clause (e.g., 206) of the first guarded command into the WHERE clause of the query language query.

In various aspects, act 1704 can include determining, by the device (e.g., 306), if any variable of any condition in the WHERE clause of the query language query is assigned in a command clause (e.g., 208) of a second guarded command (e.g., 110 and/or 404) in the sequence of guarded commands.

If the answer is yes at act 1704, in various instances, act 1706 can include, replacing, by the device (e.g., 306), the variable in the WHERE clause of the query language query with a corresponding assignment specified in the command clause of the second guarded command.

In various aspects, act 1708 can include inserting, by the device (e.g., 306), into the WHERE clause of the query language query conditions from a guard clause (e.g., 206) of the second guarded command.

In various embodiments, act 1710 can include removing, by the device (e.g., 306), from the WHERE clause of the query language query duplicate or tautological conditions.

Figure 18:
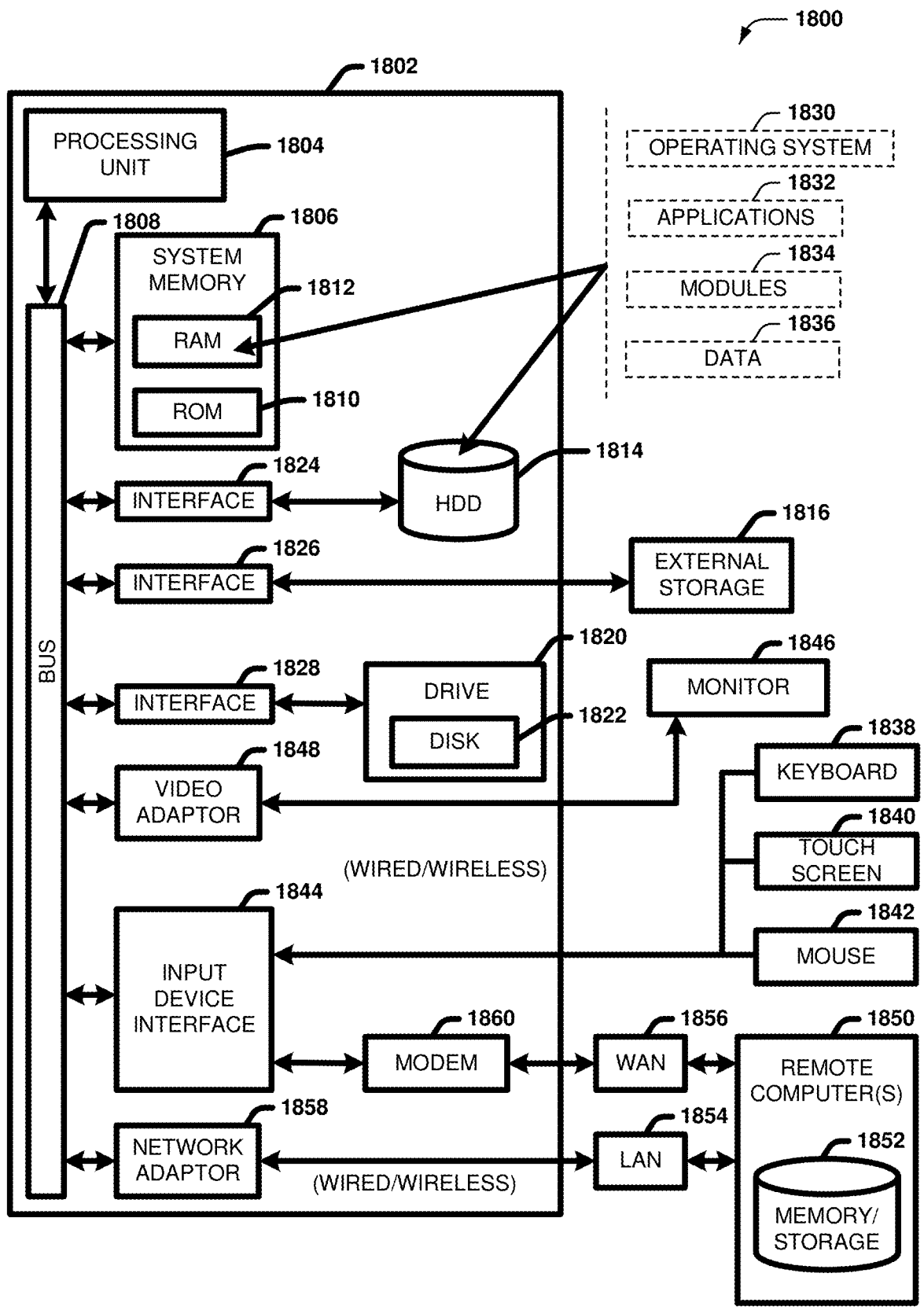
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 19:
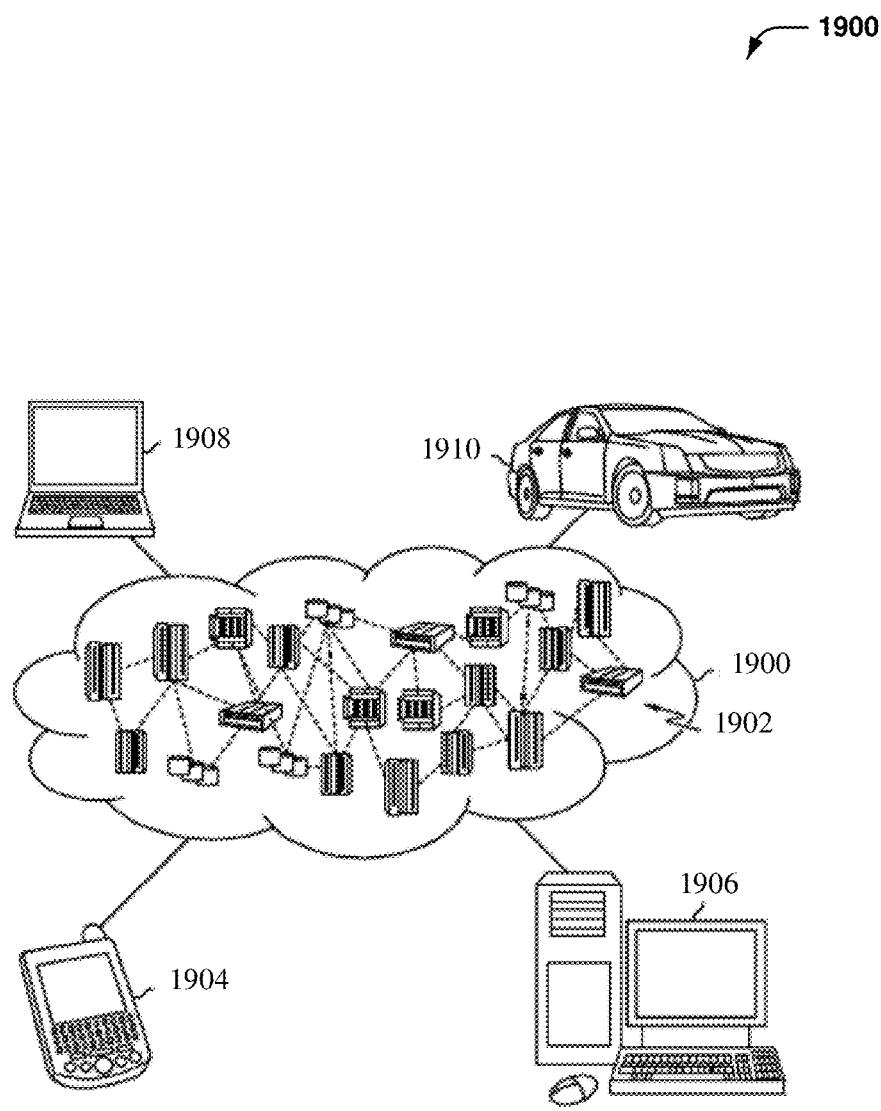
FIG. 19 illustrates an example, non-limiting cloud computing environment in accordance with one or more embodiments described herein.

Referring now to FIG. 19, illustrative cloud computing environment 1900 is depicted. As shown, cloud computing environment 1900 includes one or more cloud computing nodes 1902 with which local computing devices used by cloud consumers, such as, for example, personal digital assistant (PDA) or cellular telephone 1904, desktop computer 1906, laptop computer 1908, and/or automobile computer system 1910 may communicate. Nodes 1902 may communicate with one another. They may be grouped (not shown) physically or virtually, in one or more networks, such as Private, Community, Public, or Hybrid clouds as described hereinabove, or a combination thereof. This allows cloud computing environment 1900 to offer infrastructure, platforms and/or software as services for which a cloud consumer does not need to maintain resources on a local computing device. It is understood that the types of computing devices 1904-1910 shown in FIG. 19 are intended to be illustrative only and that computing nodes 1902 and cloud computing environment 1900 can communicate with any type of computerized device over any type of network and/or network addressable connection (e.g., using a web browser).

Figure 20:
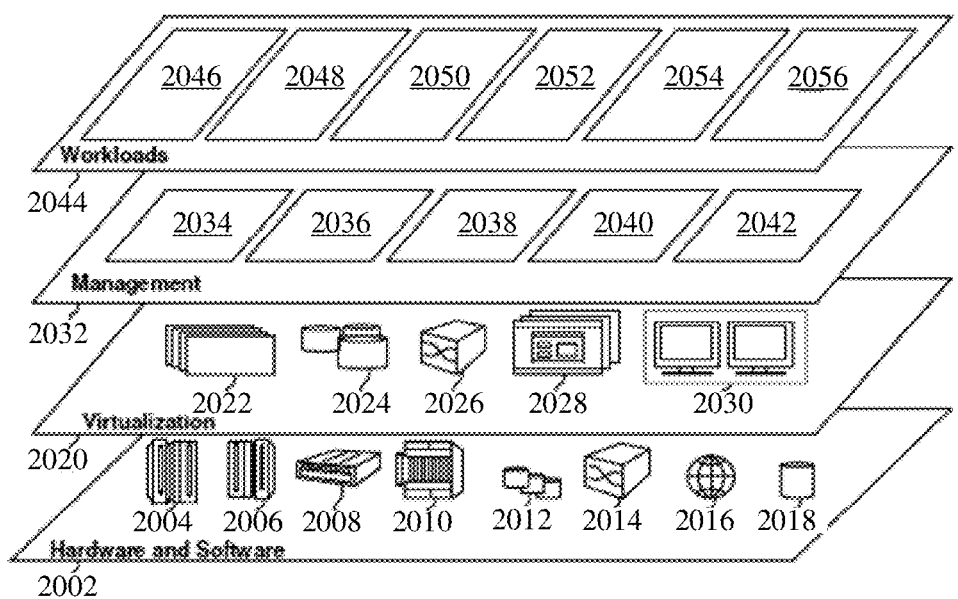
FIG. 20 illustrates example, non-limiting abstraction model layers in accordance with one or more embodiments described herein.

Referring now to FIG. 20, a set of functional abstraction layers provided by cloud computing environment 1900 (FIG. 19) is shown. Repetitive description of like elements employed in other embodiments described herein is omitted for sake of brevity. It should be understood in advance that the components, layers, and functions shown in FIG. 20 are intended to be illustrative only and embodiments of the invention are not limited thereto. As depicted, the following layers and corresponding functions are provided.

Hardware and software layer 2002 includes hardware and software components. Examples of hardware components include: mainframes 2004; RISC (Reduced Instruction Set Computer) architecture based servers 2006; servers 2008; blade servers 2010; storage devices 2012; and networks and networking components 2014. In some embodiments, software components include network application server software 2016 and database software 2018.

Virtualization layer 2020 provides an abstraction layer from which the following examples of virtual entities may be provided: virtual servers 2022; virtual storage 2024; virtual networks 2026, including virtual private networks; virtual applications and operating systems 2028; and virtual clients 2030.

In one example, management layer 2032 may provide the functions described below. Resource provisioning 2034 provides dynamic procurement of computing resources and other resources that are utilized to perform tasks within the cloud computing environment. Metering and Pricing 2036 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2038 provides access to the cloud computing environment for consumers and system administrators. Service level management 2040 provides cloud computing resource allocation and management such that required service levels are met. Service Level Agreement (SLA) planning and fulfillment 2042 provide pre-arrangement for, and procurement of, cloud computing resources for which a future requirement is anticipated in accordance with an SLA.

Workloads layer 2044 provides examples of functionality for which the cloud computing environment may be utilized. Examples of workloads and functions which may be provided from this layer include: mapping and navigation 2046; software development and lifecycle management 2048; virtual classroom education delivery 2050; data analytics processing 2052; transaction processing 2054; and differentially private federated learning processing 2056. Various embodiments of the present invention can utilize the cloud computing environment described with reference to FIGS. 19 and 20 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor, operably coupled to a memory, that executes computer-executable components stored in the memory, wherein the computer-executable components comprise:
a graph component that performs a backward traversal on a command dependence graph to identify a subgraph of the command dependence graph, wherein the subgraph comprises a first guarded command and a set of guarded commands on which the first guarded command depends, wherein the command dependence graph comprises nodes representing guarded commands, and edges representing dependencies between the guarded commands, and where each of the guarded commands comprise a computer executable command and a guard clause, and the guard clause comprises one or more conditions that initiate execution of the computer executable command;
a query generation component that generates a query language query based on conditions of respective guard clauses of the guarded commands of the subgraph, wherein query generation component comprises:
an initialization component that initializes a group of conditions of a WHERE clause of the query language query based on the one or more conditions of the guard clause of the first guarded command;
a transformation component that transforms the group of conditions of the WHERE clause of the query language query based on the conditions of the respective guard clauses of a sequence of guarded commands of the set of guarded commands; and
a translation component that converts the transformed group of conditions of the WHERE clause of the query language query into query language syntax;
an execution component that executes the query language query on a data table to return a dataset for testing the first guarded command prior to implementing the first guarded command in a commercial context; and
a testing component that tests the first guarded command using the dataset to determine whether the execution of the computer executable command of the first guarded command is initiated.

2. The system of claim 1, wherein:
the initialization component inserts the one or more conditions from the guard clause of the first guarded command into the group of conditions of the WHERE clause of the query language query; and
the transformation component in response to determining that a variable of the group of conditions of the WHERE clause of the query language query is assigned in the computer executable command of a second guarded command in the sequence of guarded commands:
replaces the variable in the WHERE clause of the query language query with a corresponding assignment of the variable specified in the computer executable command of the second guarded command; and
inserts into the group of conditions of the WHERE clause of the query language query one or more conditions from the guard clause of the second guarded command.

3. The system of claim 2, wherein the transformation component removes from the group of conditions of the WHERE clause of the query language query at least one of duplicate conditions or tautological conditions.

4. The system of claim 1, wherein the graph component performs a topological sort on the subgraph to generate the sequence of guarded commands.

5. The system of claim 1, wherein the dataset causes the group of conditions of the WHERE clause of the query language query to evaluate true.

6. The system of claim 1, wherein, for a given condition of the group of conditions of the WHERE clause of the query language query, the dataset causes the given condition to evaluate false and causes conditions preceding the given condition to evaluate true.

7. The system of claim 1, wherein the testing component at least one of:
determines whether the execution of the computer executable command of the first guarded command is initiated in response to all conditions of the respective guard clauses of the set of guarded commands on which the first guarded command depends evaluating as true, or
determines whether the execution of the respective computer executable command of the first guarded command is initiated in response to at least one of the conditions of the respective guard clauses of the set of guarded commands on which the first guarded command depends evaluating as false.

8. A computer-implemented method, comprising:
performing, by a device operatively coupled to a processor, a backward traversal on a command dependence graph to identify a subgraph of the command dependence graph, wherein the subgraph comprises a first guarded command and a set of guarded commands on which the first guarded command depends, wherein the command dependence graph comprises nodes representing guarded commands, and edges representing dependencies between the guarded commands, and where each of the guarded commands comprise a computer executable command and a guard clause, and the guard clause comprises one or more conditions that initiate execution of the computer executable command;

generating, by the device, a query language query based on conditions of the respective guard clauses of the guarded commands of the subgraph, wherein the generating the query language query comprises:

initializing a group of conditions of a WHERE clause of the query language query based on the one or more conditions of the guard clause of the first guarded command;

transforming the group of conditions of the WHERE clause of the query language query based on the conditions of the respective guard clauses of a sequence of guarded commands of the set of guarded commands; and converting the transformed group of conditions of the WHERE clause of the query language query into query language syntax;

executing, by the device, the query language query on a data table to return a dataset for testing the first guarded command prior to implementing the first guarded command in a live commercial environment; and testing, by the device, the first guarded command using the dataset to determine whether the execution of the computer executable command of the first guarded command is initiated.

9. The computer-implemented method of claim 8, further comprising:

inserting, by the device, the one or more conditions from the guard clause of the first guarded command into the group of conditions of the WHERE clause of the query language query; and in response to determining that a variable of the group of conditions of the WHERE clause of the query language query is assigned in the computer executable command of a second guarded command in the sequence of guarded commands:

replacing, by the device, the variable in the WHERE clause of the query language query with a corresponding assignment of the variable specified in the computer executable command of the second guarded command; and inserting, by the device, into the group of conditions of the WHERE clause of the query language query one or more conditions from the guard clause of the second guarded command.

10. The computer-implemented method of claim 9, further comprising:

removing, by the device, from the group of conditions of the WHERE clause of the query language query at least one of duplicate conditions or tautological conditions.

11. The computer-implemented method of claim 8, further comprising:

performing, by the device, a topological sort on the subgraph to generate the sequence of guarded commands.

12. The computer-implemented method of claim 8, wherein the dataset causes the group of conditions of the WHERE clause of the query language query to evaluate true.

13. The computer-implemented method of claim 8, wherein, for a given condition of the group of conditions of the WHERE clause of the query language query, the dataset causes the given condition to evaluate false and causes conditions preceding the given condition to evaluate true.

14. The computer-implemented method of claim 8, wherein the testing comprises at least one of:

determining whether the execution of the computer executable command of the first guarded command is initiated in response to all conditions of the respective guard clauses of the set of guarded commands on which the first guarded command depends evaluating as true, or determining whether the execution of the respective computer executable command of the first guarded command is initiated in response to at least one of the conditions of the respective guard clauses of the set of guarded commands on which the first guarded command depends evaluating as false.

15. A computer program product for facilitating automated generation of relevant and adequate test datasets based on guarded commands, the computer program product comprising a computer readable memory having program instructions embodied therewith, the program instructions executable by a processing component to cause the processing component to:

perform a backward traversal on a command dependence graph to identify a subgraph of the command dependence graph, wherein the subgraph comprises a first guarded command and a set of guarded commands on which the first guarded command depends, wherein the command dependence graph comprises nodes representing the guarded commands, and edges representing dependencies between the guarded commands, and where each of the guarded commands comprise a computer executable command and a guard clause, and the guard clause comprises one or more conditions that initiate execution of the computer executable command;

generate a query language query based on conditions of respective guard clauses of the guarded commands of the subgraph, wherein the generation of the query language query comprises:

initialize a group of conditions of a WHERE clause of the query language query based on the one or more conditions of the guard clause of the first guarded command;

transform the group of conditions of the WHERE clause of the query language query based on the conditions of the respective guard clauses of a sequence of guarded commands of the set of guarded commands; and convert the transformed group of conditions of the WHERE clause of the query language query into query language syntax;

execute the query language query on a data table to return a dataset for testing the first guarded command prior to implementing the first guarded command in a live runtime environment; and test the first guarded command using the dataset to determine whether the execution of the computer executable command of the first guarded command is initiated.

16. The computer program product of claim 15, wherein the program instructions are further executable to cause the processing component to:

insert the one or more conditions from the guard clause of the first guarded command into the group of conditions of the WHERE clause of the query language query; and in response to determining that a variable of in the group of conditions of the WHERE clause of the query language query is assigned in the computer executable command of a second guarded command in the sequence of guarded commands:

replace the variable in the WHERE clause of the query language query with a corresponding assignment of the variable specified in the computer executable command of the second guarded command; and insert into the group of conditions of the WHERE clause of the query language query one or more conditions from the guard clause of the second guarded command.

17. The computer program product of claim 16, wherein the program instructions are further executable to cause the processing component to:

remove from the group of conditions of the WHERE clause of the query language query at least one of duplicate conditions or tautological conditions.

18. The computer program product of claim 15, wherein the program instructions are further executable to cause the processing component to: performing, by the device, a topological sort on the subgraph to generate the sequence of guarded commands.

19. The computer program product of claim 15, wherein the dataset causes the group of conditions of the WHERE clause of the query language query to evaluate true.

20. The computer program product of claim 15, wherein, for a given condition of the group of conditions of the WHERE clause of the query language query, the dataset causes the given condition to evaluate false and causes conditions preceding the given condition to evaluate true.

* * * * *